(12) United States Patent
Anderson et al.

(10) Patent No.: US 9,174,528 B2
(45) Date of Patent: Nov. 3, 2015

(54) NON-METALLIC FUEL TANK

(71) Applicants: Kenneth S. Anderson, Rexburg, ID (US); Klint S. Anderson, Rigby, ID (US)

(72) Inventors: Kenneth S. Anderson, Rexburg, ID (US); Klint S. Anderson, Rigby, ID (US)

( * ) Notice: Subject to any disclaimer, the term of this patent is extended or adjusted under 35 U.S.C. 154(b) by 142 days.

(21) Appl. No.: 13/962,414

(22) Filed: Aug. 8, 2013

(65) Prior Publication Data
US 2014/0042160 A1    Feb. 13, 2014

Related U.S. Application Data

(60) Provisional application No. 61/681,544, filed on Aug. 9, 2012.

(51) Int. Cl.
*B60K 15/07* (2006.01)
*B60K 15/03* (2006.01)

(52) U.S. Cl.
CPC ........... *B60K 15/03177* (2013.01); *B60K 15/03* (2013.01); *B60K 15/07* (2013.01)

(58) Field of Classification Search
CPC ................ B60K 15/067; B60K 15/07; B60K 2015/0637; F17C 13/084
USPC ........................... 280/834, 830; 220/4.14, 562
See application file for complete search history.

(56) References Cited

U.S. PATENT DOCUMENTS

| 3,854,621 | A |   | 12/1974 | Parry |
|---|---|---|---|---|
| 4,013,300 | A | * | 3/1977 | Berger .......................... 280/834 |
| 4,357,027 | A |   | 11/1982 | Zeitlow |
| 4,741,187 | A |   | 5/1988 | Ethell |
| 5,020,687 | A |   | 6/1991 | Seizert |
| 6,039,203 | A |   | 3/2000 | McDaniel |
| 6,260,516 | B1 |   | 7/2001 | Brister |
| 6,352,167 | B1 |   | 3/2002 | Yu |
| 7,044,504 | B2 | * | 5/2006 | Studebaker et al. .......... 280/783 |
| 7,255,190 | B1 | * | 8/2007 | Floro ............................ 180/219 |
| 2008/0011743 | A1 | * | 1/2008 | Edwards ...................... 220/4.14 |
| 2009/0045226 | A1 |   | 2/2009 | Munlin |
| 2014/0048541 | A1 | * | 2/2014 | Pirtle ........................... 220/562 |
| 2014/0103628 | A1 | * | 4/2014 | De Biasi et al. .............. 280/834 |

FOREIGN PATENT DOCUMENTS

| CN | 2653475 | 11/2004 |
|---|---|---|
| EP | 0951417 | 8/2003 |

* cited by examiner

*Primary Examiner* — Tony Winner
(74) *Attorney, Agent, or Firm* — Schmeiser, Olsen & Watts LLP

(57) ABSTRACT

A non-metallic fuel tank includes a non-metallic tank body, at least one coupling device or mounting system for coupling the non-metallic tank body to a bed of a truck or to a trolley, and a fuel fill opening. A grounding wire may be coupled to the non-metallic tank as well as a fuel line connector which is also coupled to the existing fuel system of a truck. A mounting system for a non-metallic fuel tank includes two rear toe clamps and two front mounting assemblies which include a front mount base and an angle iron coupled together. A portable fuel tank includes a non-metallic tank body and a trolley coupled to the tank body. The trolley includes a base, a mounting system for coupling the non-metallic tank body and the base, at least one handle and at least one wheel.

6 Claims, 26 Drawing Sheets

NON-METALLIC FUEL TANK

CROSS-REFERENCE TO RELATED APPLICATION

The present application is related to and claims priority to prior U.S. Provisional Patent Application Ser. No. 61/681,544, entitled "NON-METALLIC FUEL TANK", filed Aug. 9, 2012 the relevant portions of said application are incorporated herein by reference.

BACKGROUND OF THE INVENTION

1. Technical Field

This invention relates to a non-metallic in-the-bed or portable fuel tank for expanding the fuel capacity of a vehicle or for fueling vehicles in locations distant from fuel pumps.

2. Background Art

All vehicles have a limited capacity fuel tank. For basic everyday driving, the limited capacity of the fuel tank is not normally an issue. There are many situations, however, where the limited capacity of a vehicle's fuel tank may become an issue. For example, larger vehicles such as pickup trucks burn a lot more fuel than a small vehicle commuting to and from an office. These vehicles may also travel in areas where there are no fuel stations. This makes additional fuel capacity a necessity in many situations.

In order to increase the fuel capacity of a vehicle, people have designed replacement or transfer fuel tanks. These replacement or transfer fuel tanks have been around for decades.

Replacement fuel tanks are simply larger capacity fuel tanks that fit into the same location that the original fuel tank was in. These tanks are, however, limited by the space available where the original fuel tank was located.

Transfer fuel tanks are secondary fuel tanks that may be placed in other locations of the vehicle. For example, a secondary fuel tank could be placed in the bed of a truck. As the fuel level drops in the original fuel tank, the transfer fuel tank is accessed by the vehicle automatically or by a switch.

In other situations, such as at an autoshop or a dealership, a portable fuel tank may be desired so that vehicles which have had their fuel drained can be refueled in place. In these situations a portable tank that is lightweight, durable and corrosion resistant is desired.

These portable, replacement and transfer fuel tanks have always been made from metal. Metal tanks have many problems, however, including their weight and corrodibility.

Accordingly, what is needed is a non-metallic fuel tank that is lightweight and corrosion resistant.

DISCLOSURE OF THE INVENTION

The non-metallic fuel tank, as disclosed hereafter in this application, is corrosion resistant, lightweight and easily movable or removable. In particular embodiments, a fuel tank for use in a bed of a truck includes a non-metallic tank body, at least one coupling device for coupling the non-metallic tank body to the bed of the truck, a grounding wire coupled to the non-metallic tank, and a fuel fill opening in the non-metallic tank body. A fuel line connector may also be coupled to the non-metallic tank and fluidly coupled to an existing fuel system in the truck.

A mounting system for a fuel tank for use in a bed of a truck may include a non-metallic tank body, at least one mounting indent formed in the non-metallic tank body, and at least one coupling indentation formed in the non-metallic tank body. At least one rear toe clamp may mate with the at least one mounting indent and the at least one coupling indentation. The at least one rear toe clamp is also coupled to the bed of the truck. At least one front mounting assembly includes a front mount base which may mate with the at least one coupling indentation and is coupled to the bed of the truck. The front mounting assembly may also include an angle iron adjustably coupled to the front mount base and mating with the at least one mounting indent.

A portable fuel tank may include a non-metallic tank body, at least one mounting indent formed in the non-metallic tank body, and a trolley coupled to the non-metallic tank body. The trolley may further include a base, a mounting system coupled to the base, at least one handle coupled to the base, and at least one wheel coupled to the base. The mounting system may couple the trolley to the non-metallic tank body by mating with the at least one mounting indent formed in the non-metallic tank body.

The foregoing and other features and advantages of the non-metallic fuel tank will be apparent to those of ordinary skill in the art from the following more particular description of the invention and the accompanying drawings.

BRIEF DESCRIPTION OF THE DRAWINGS

The invention will hereinafter be described in conjunction with the appended drawings where like designations denote like elements, and.

DESCRIPTION OF THE INVENTION

Figure 1:
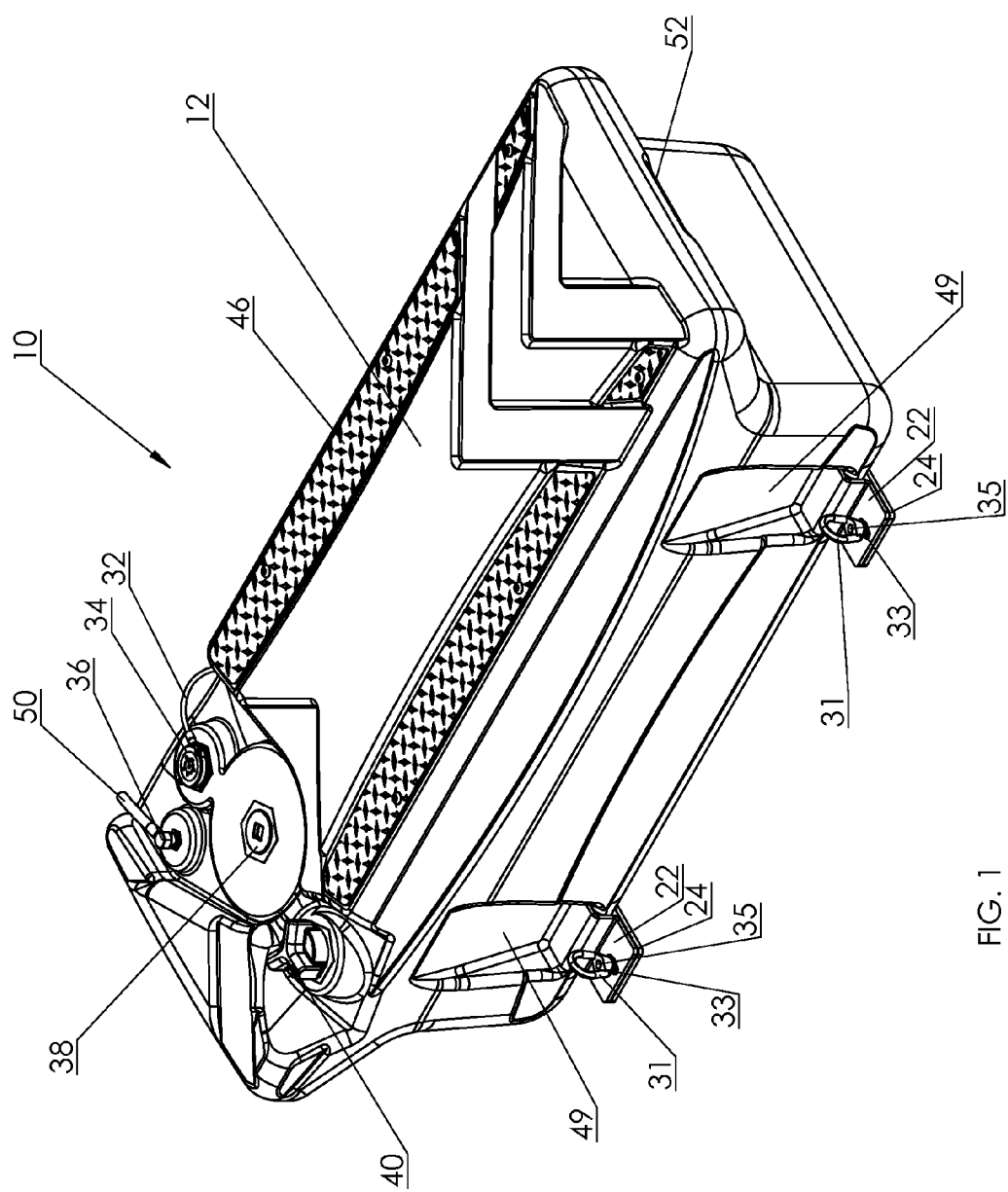
FIG. 1 is an isometric view of a non-metallic in-the-bed fuel tank.
Figure 2:
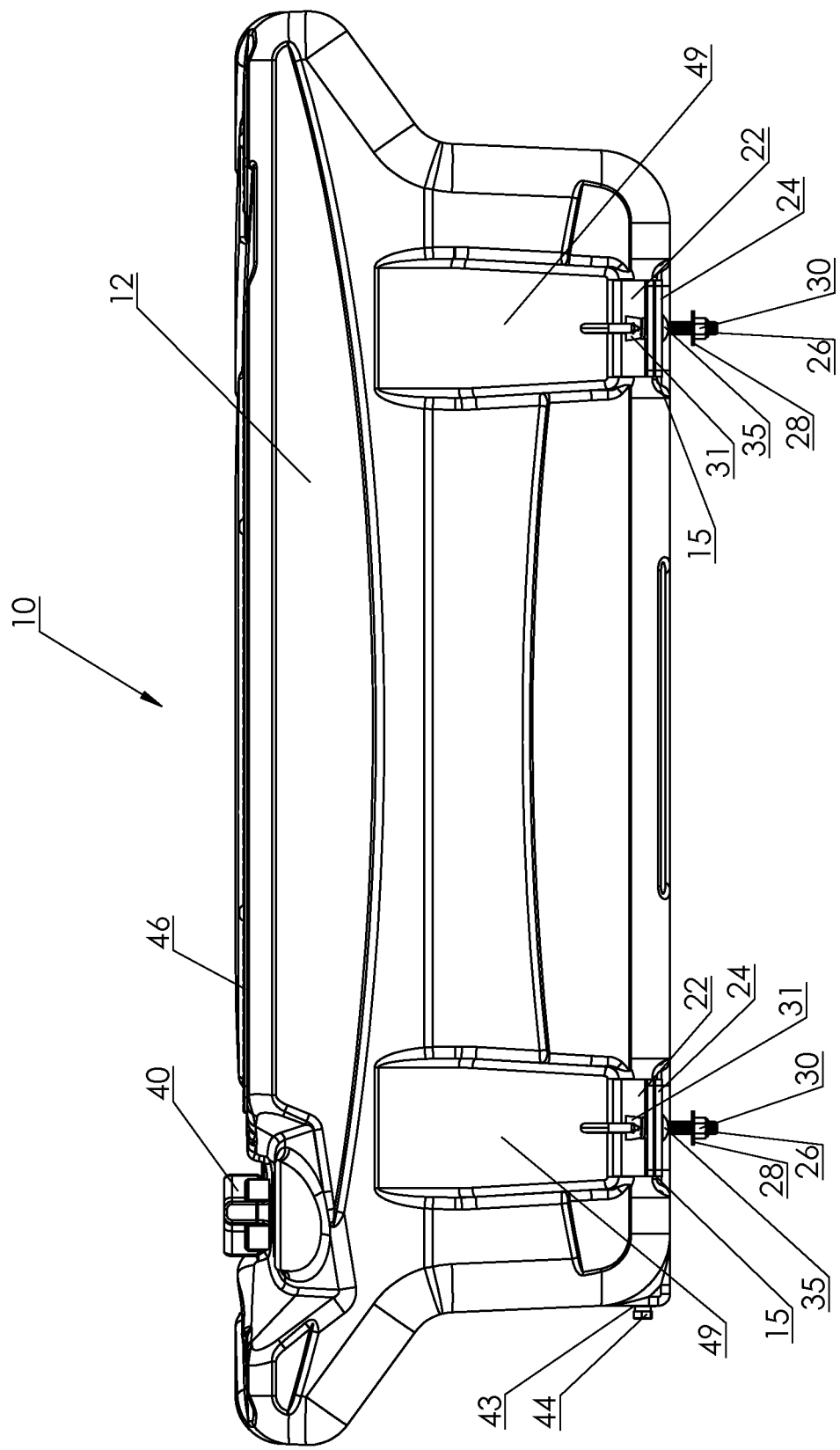
FIG. 2 is a front view of a non-metallic in-the-bed fuel tank.
Figure 3:
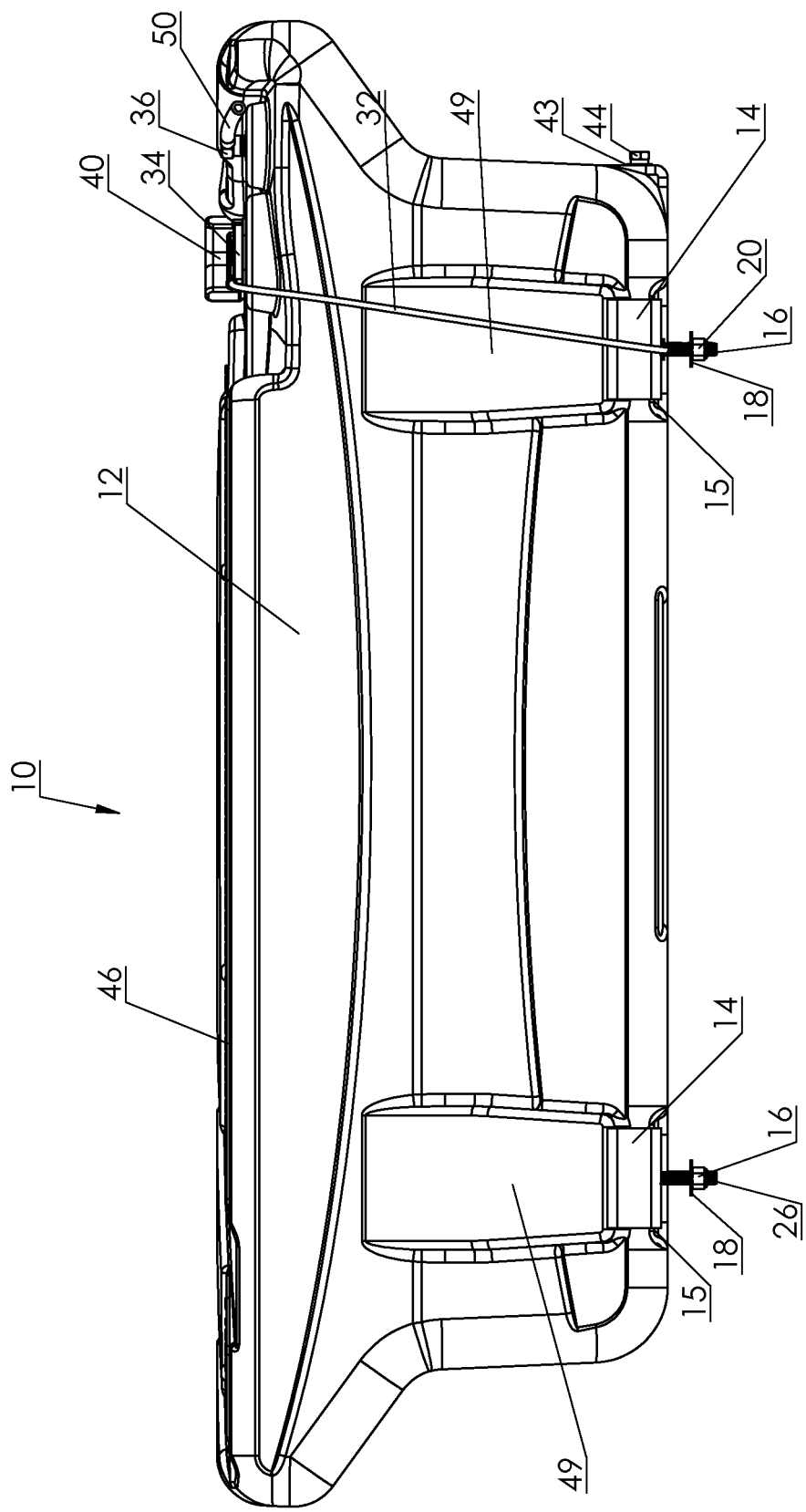
FIG. 3 is a rear view of a non-metallic in-the-bed fuel tank.
Figure 4:
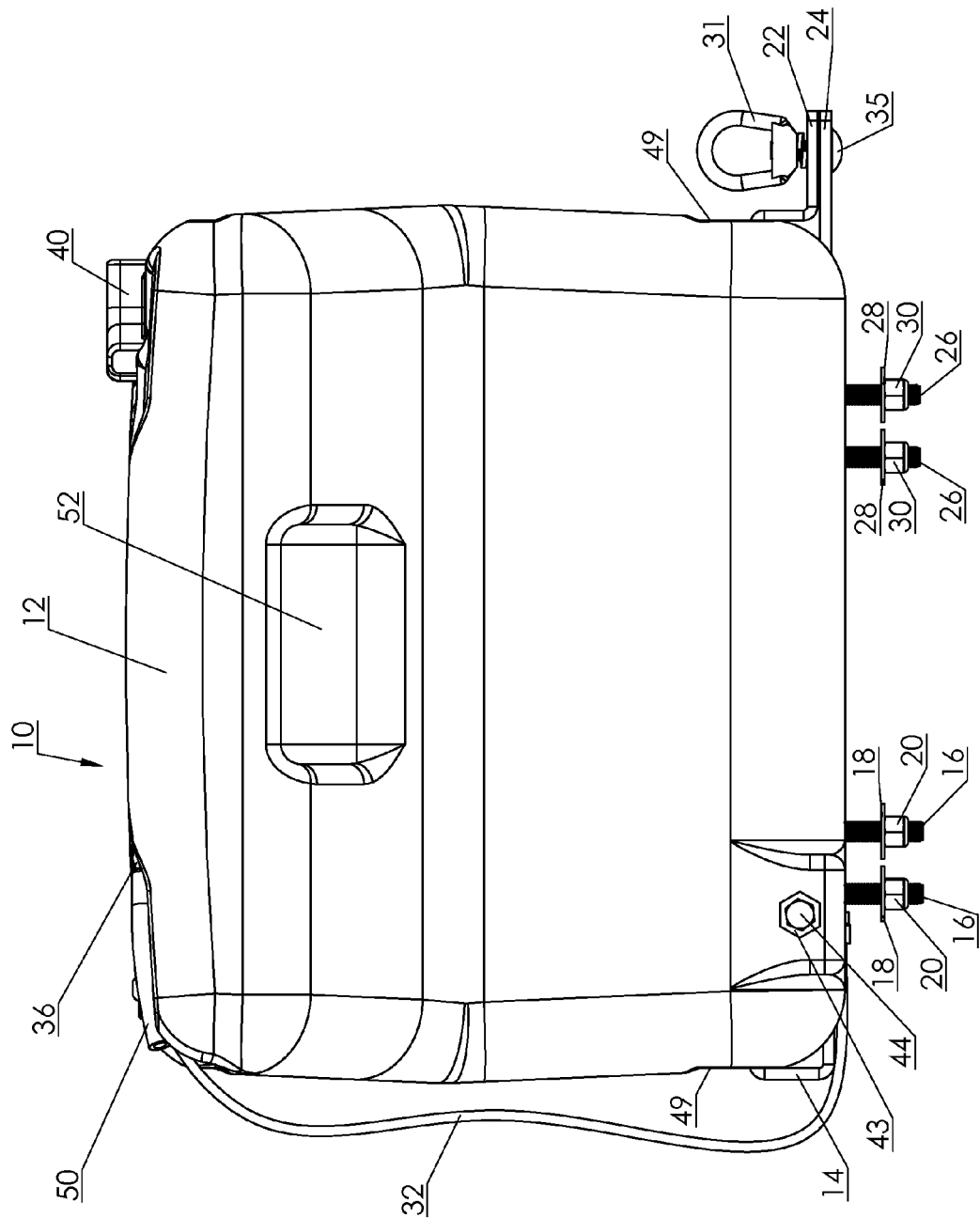
FIG. 4 is a first side view of a non-metallic in-the-bed fuel tank.
Figure 5:
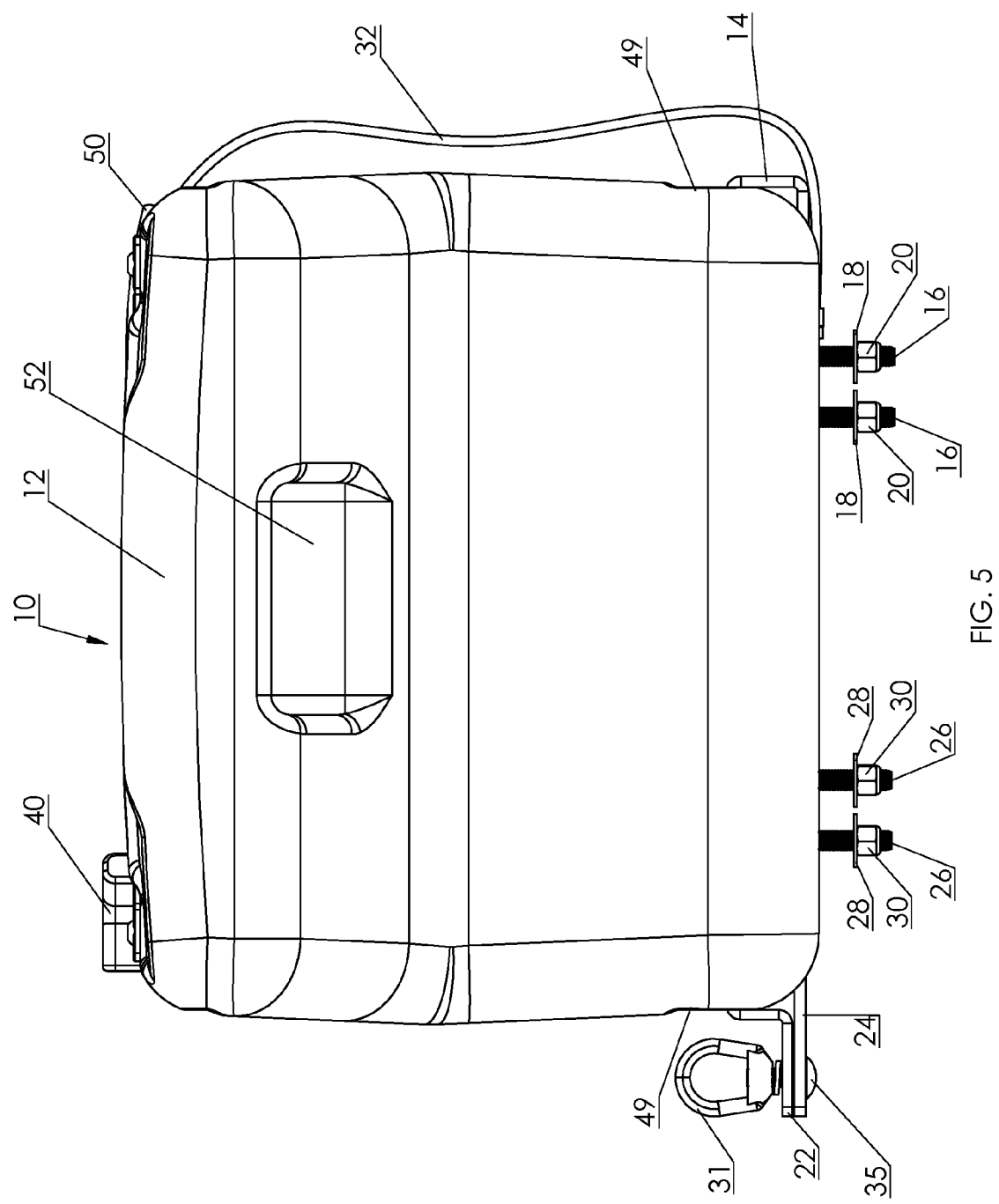
FIG. 5 is a second side view of a non-metallic in-the-bed fuel tank.
Figure 6:
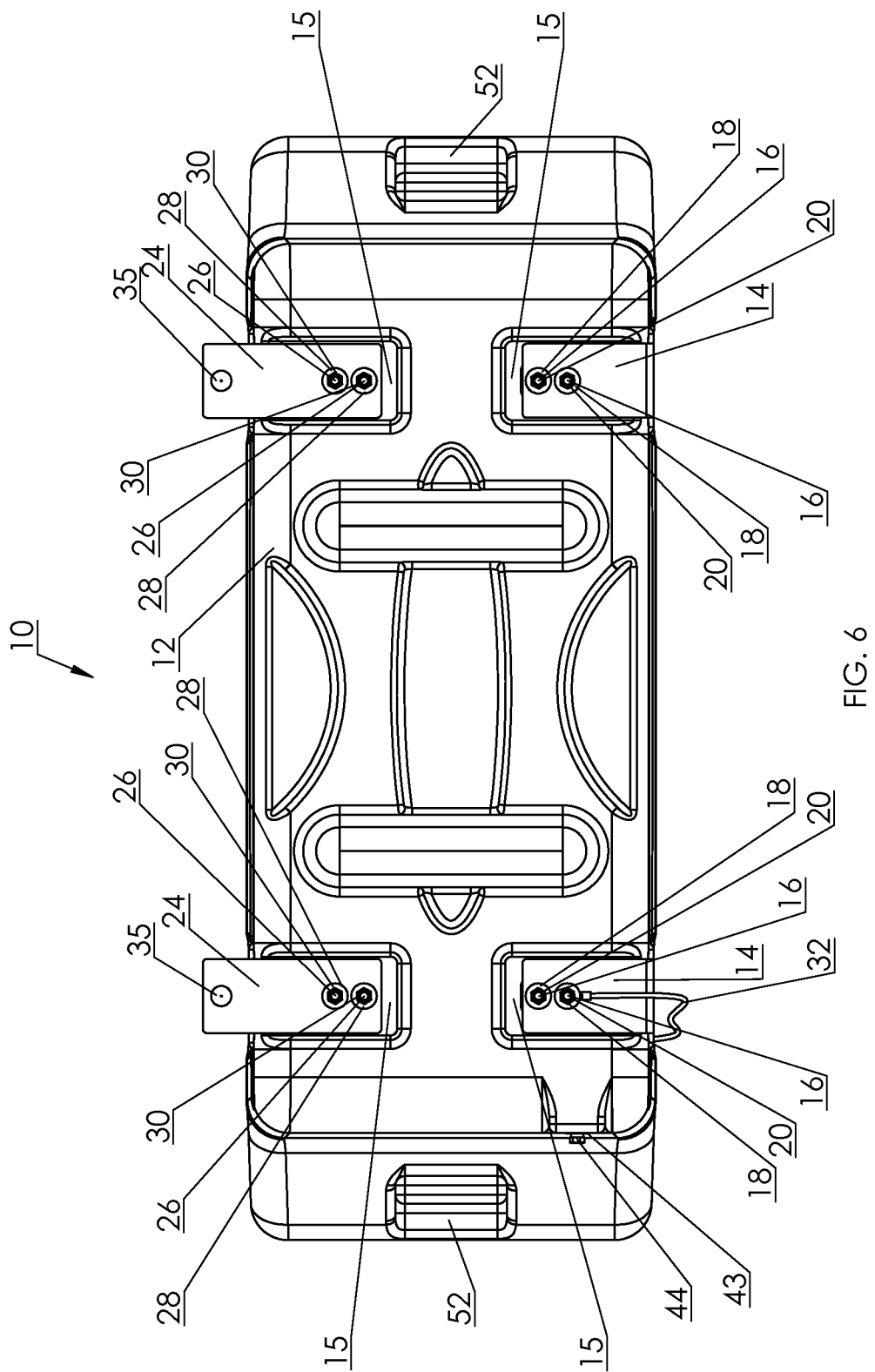
FIG. 6 is a bottom view of a non-metallic in-the-bed fuel tank.
Figure 7:
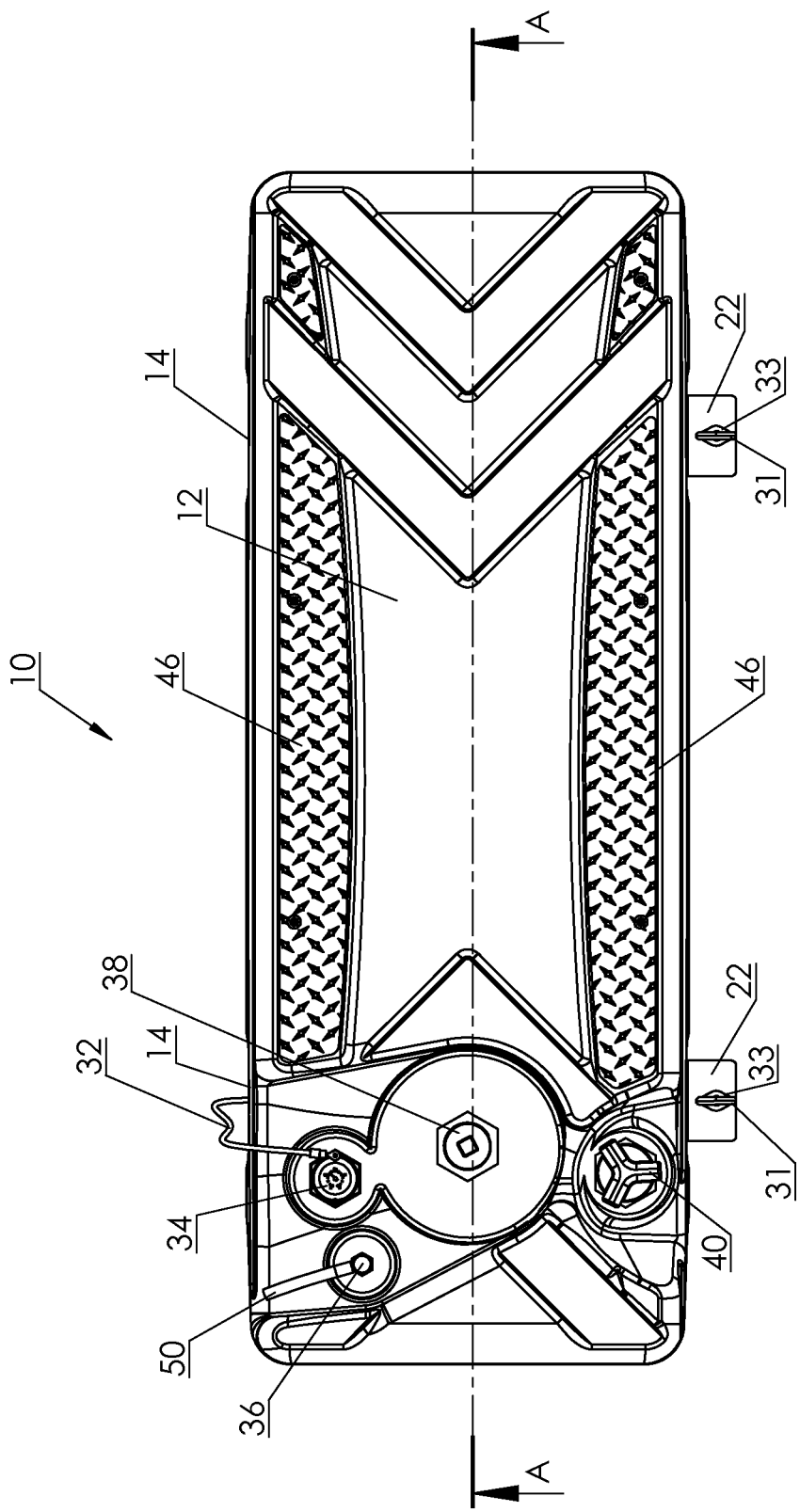
FIG. 7 is a top view of a non-metallic in-the-bed fuel tank.

As discussed above, embodiments of the present invention relate to a non-metallic fuel tank for expanding the fuel capacity of a vehicle, typically a truck. In particular, disclosed is an in-the-bed transfer fuel tank that is formed from a material other than metal in order to allow the tank to be corrosion resistant and lightweight. This same tank may also be used as a portable fuel tank for fueling vehicles in a shop or the like.

FIGS. 1-9 illustrate a non-metallic in-the-bed transfer fuel tank 10. The non-metallic in-the-bed transfer fuel tank 10 includes a tank body 12. The tank body 12 is formed from any non-metallic material. The tank body 12 is the portion of the fuel tank 10 that contains the fuel. The tank body 12 may be formed from any non-metallic material which does not react with the fuel contained in it. For instance, diesel fuel is less volatile than gasoline and so diesel fuel tanks may be formed from any polymeric, ceramic, composite, nylon or the like. The tank body 12 could also be lined with a material other than the one used to form the tank body 12 itself. The preferred materials for the tank body 12 are those that can be easily formed through processes such as rotational molding or the like. By using rotational molding to form the tank body 12, a seamless tank body 12 may be created which has increased strength. The materials will also need to withstand the abuse that items in a truck bed may receive. The tank body 12 may also be exposed to sunlight and the elements for extended periods of time. Therefore the materials used to form the tank body 12 will need to withstand sunlight and the elements without degrading. One material, which has the characteristics desired, is high density cross-linked polyethylene.

High density cross-linked polyethylene can withstand heat and cold. It is also very resistant to chemicals and has high impact strength.

The tank body 12 may be formed in any shape desired. In the embodiments illustrated in the figures, the tank body 12 is rectangular in order to minimize the amount of lost space in a truck bed. For instance, if the tank body 12 were circular or some other shape, there would be space that would not be usable between the tank 10 and the truck bed. The tank body 12, however, could also be a rectangle that is taller than it is long in order to minimize the amount of space used in the truck bed, while maximizing the quantity of additional fuel. The tank body 12 could also be formed with various curves or protrusions in order to better fit the contour of the truck bed.

Formed into the tank body 12 are handles 52. The fuel tank 10 is designed to be lightweight and can be easily installed and removed from a truck bed. In order to aid in the installation and removal of the fuel tank 10, handles 52 may be formed in both sides of the tank body 12. The handles 52 as illustrated are indentations formed in the ends of the tank body 12. The handles 52, however, could also be handles 52 which are attached to the outside of the tank body 12.

Also formed into the tank body 12 are a number of mounting indents 49. These mounting indents 49 are indentations in the tank body 12 that have a small lip at the bottom of the indent 49. The mounting or coupling system attaches to the lip of the mounting indent 49.

The figures illustrate four mounting indents 49 on the tank body 12. This number can, however, be increased or decreased in order to appropriately secure the tank 10 to the bed of a truck.

The tank 10 is secured in the bed of a truck through a mounting system utilizing a rear toe clamp coupler and a front clamp coupler. The rear toe clamp coupler is made up of a rear toe clamp 14. The rear toe clamp 14 is a C-shaped channel with an extended lower third. The extended lower third is coupled to the bed of the truck through use of rear toe clamp bolts 16 which are secured with rear toe clamp washers 18 and rear toe clamp nuts 20. In the installation of the tank 10 in the bed of the truck, the rear toe clamps 14 are placed in the bed of the truck before the tank 10 is placed in the truck. The tank 10 is then slid into place with the rear toe clamp 14 encompassing the lip of the rear mounting indents 49 on the tank 10.

The rear toe clamps 14 in this embodiment are typically made of metal. If desired, however, the rear toe clamps 14 may be formed from any material strong enough to produce the desired result of securing the rear portion of the tank 10 to the bed of the truck.

The rear toe clamps 14 may also be shaped in any way that performs the desired task. In the embodiment illustrated, the rear toe clamps 14 are shaped as a C-channel with an extended lower third. It is feasible that they could be shaped as semi-circles or in other desired shapes.

Often the bed of a truck is corrugated, having lower channels that run through the bed of the truck. This can be a problem when trying to securely mount something in the bed of the truck. If the mounting system is crooked or some of the mounts fall into the lower parts of the truck bed, the item being mounted will either fail to mount securely or will be mounted crooked. In order to avoid this issue, the rear toe clamps 14 are wide enough that they will always hit at least one of the high points in the truck bed. The rear toe clamps 14 will typically be at least 4 inches wide. When mounting the tank 10 in the bed of the truck, the rear toe clamp bolts 16 are not tightened until the tank 10 is slid into place in the rear toe clamps 14. The bottom of the tank 10 has coupling indentations 15 formed in it. These indentations are specifically shaped to hold the elongated portion of the rear toe clamps 14 in position against the tank 10 side. The bottom of the tank 10, in particular the coupling indentations 15, and the shape of the toe clamps 14 forces the rear toe clamps 14 to be aligned flush against the bottom of the tank 10 and parallel to the truck bed. The bottom of the tank 10 and the bottom of the rear toe clamps 14 will lie in the same plane when the tank 10 is installed. The toe clamp bolts 16 can then be tightened down and the tank 10 remains level in the truck bed. This self leveling of the mounting system is an important feature of the mounting system for the tank 10.

The front mounting system is similar to the rear mounting system. The front mounting system or front clamp coupler includes an angle iron 22, front mount base 24, front clamp bolts 26, front clamp washers 28, front clamp nuts 30, an eye nut 31 and an angle iron bolt 35. When installing the tank 10 into the truck or other vehicle, the rear toe clamp coupling system is put in place. The front mount base 24 is also installed in the truck bed. The front mount base 24 is coupled to the truck bed by using the front clamp bolts 26 which are secured in place with the front clamp washers 28 and the front clamp nuts 30.

The front mount base 24 may be a flat rectangular piece of metal with holes in it for mounting it to the truck bed. It also has an angle iron bolt 35 coupled to it for attaching the remainder of the front coupling system. The angle iron bolt 35 may be coupled to the front mount base 24 by welding or by inserting the angle iron bolt 35 through a hole in the front mount base 24 or the like. Though in the illustrated embodiment, the front mount base 24 is a flat rectangular piece of metal, it may also be formed from any material or in any shape that produces the desired result of aiding in securing the tank 10 to the truck bed.

Similarly to the rear toe clamps 14, the front mount base 24 is wide enough (typically 4 inches or wider) so that it will, at least partially, abut a high portion of a corrugated truck bed. The front mount base 24 also fits into the coupling indentations 15 on the bottom of the tank 10. These coupling indentations 15 force the front mount bases 24 into position with the tank 10 sides. When the clamps are all in place and the tank 10 is being tightened in position, the front mount base 24 is pulled flush into the coupling indentations 15 on the bottom of the tank 10 and parallel to the bed of the truck.

Once the rear toe clamp coupling system and the front mount base 24 are in position in the truck bed, the tank 10 is slid into position. The lips of the rear mounting indents 49 are slid into the rear toe clamps 14. Then, once the tank 10 is in position, an angle iron 22 is coupled to the top of the front mount base 24.

The angle iron 22 is a piece of metal shaped like the letter Z except the middle piece is perpendicular and the Z is upside down. The upper portion of the angle iron 22 is used to secure the lip of the front mount indents 49 in place. This is done by securing the lower portion of the angle iron 22 to the front mount base 24. In order to secure the angle iron 22 to the front mount base 24, a slotted hole 33 is cut into the lower portion of the Z angle iron 22. This slotted hole 33 allows the front clamping system to be adjusted in order to securely position the tank 10 in the bed of the truck. The angle iron 22 is put in position on the front mount base 24 by aligning the angle iron bolt 35 with the slotted hole 33 in the angle iron 22. The angle iron 22 is then secured into position with an eye nut 31 placed on the angle iron bolt 35. The angle iron 22 may also be secured in position with a lock washer prior to being secured into position with an eye nut 31.

At this point in the assembly, the angle iron 22 can be slid towards the tank 10 or away from the tank 10 in order to more securely attach the tank 10 to the bed of the truck. The eye nut 31 can then be tightened down.

The eye nut 31 is a specially shaped nut. It tightens down on a bolt like any normal nut, but it also has a loop on the top that is coupled directly across the diameter of the hole in the nut. This loop can be used as a tie down to help secure cargo in the bed of the truck.

Once the tank 10 is in position in the truck, the front clamp bolts 26 and the rear toe clamp bolts 16 are tightened down in order to securely couple the tank 10 to the rear of the truck.

If the user should wish to remove the tank 10 from the bed of the truck, the angle iron bolt 35 can be loosened and the angle iron 22 removed. The tank 10 can then be slipped out of the bed of the truck like it was slipped in.

The tank 10 may also be equipped with a fuel gauge 34. The fuel gauge 34 is inserted into the tank 10 through an opening in the top of the tank 10. The fuel gauge 34 extends into the fuel contained inside the tank 10 and tells the user how much fuel is contained in the tank 10.

A grounding wire 32 is also coupled to the tank 10. Due to the material which the tank 10 is made of, it is important to make sure that all static electricity or other electricity is grounded somewhere safe in order to prevent the fuel in the tank from being ignited. The grounding wire 32 is coupled to the tank 10 at the same opening which contains the fuel gauge 34. The grounding wire 32 then extends to the bottom of the tank 10 where it may be grounded to the truck bed itself or to the metal mounting system.

An additional opening in the top of the tank 10 may be used as a fuel fill opening and may contain a fill neck 42. The fill neck 42 allows a fuel pump nozzle to be placed into the opening in the top of the tank 10 so that the tank 10 can be filled with fuel.

The fill neck 42 is sealed with a fuel cap 40. The fuel cap 40 may be any type and style desired.

In the embodiment illustrated there are two additional openings in the top of the tank 10. The first opening is filled with a plug 38 in the drawings. This opening is designed to contain a pump if the user desires to pump the fuel out of the tank 10 for any reason. A pump in this location would allow a user to pump fuel out of the tank 10 for use in other vehicles or for other applications.

The second additional opening in the top of the tank 10 contains a vent 36. The vent 36 is designed to allow air to enter the tank as fuel leaves the tank. The vent 36 also acts as a rollover valve which shuts off the vent to stop any fuel leaking in case of a vehicle rollover.

The vent 36 has a vent hose 50 attached to it. The vent hose 50 is a small rubber hose that, when attached to the vent 36, prevents the vent 36 from clogging.

The side of the tank 10 contains a fuel line opening 43. This opening 43 is used to couple the tank 10 into the existing fuel system of the vehicle. In the figures this opening 43 is sealed with a fuel line plug 44.

The top of the tank 10 may have diamond plate 46 metal attached to it for aesthetics. The diamond plate 46 metal may be replaced with any other type of aesthetically pleasing material such as wood, or the like.

The diamond plate 46 may be coupled to the top of the tank 10 with tool box/diamond plate mounting screws 48. The diamond plate 46 may be coupled to the top of the tank 10 by any means desired. Alternate coupling methods may include epoxy, glue or the like.

Figure 8:
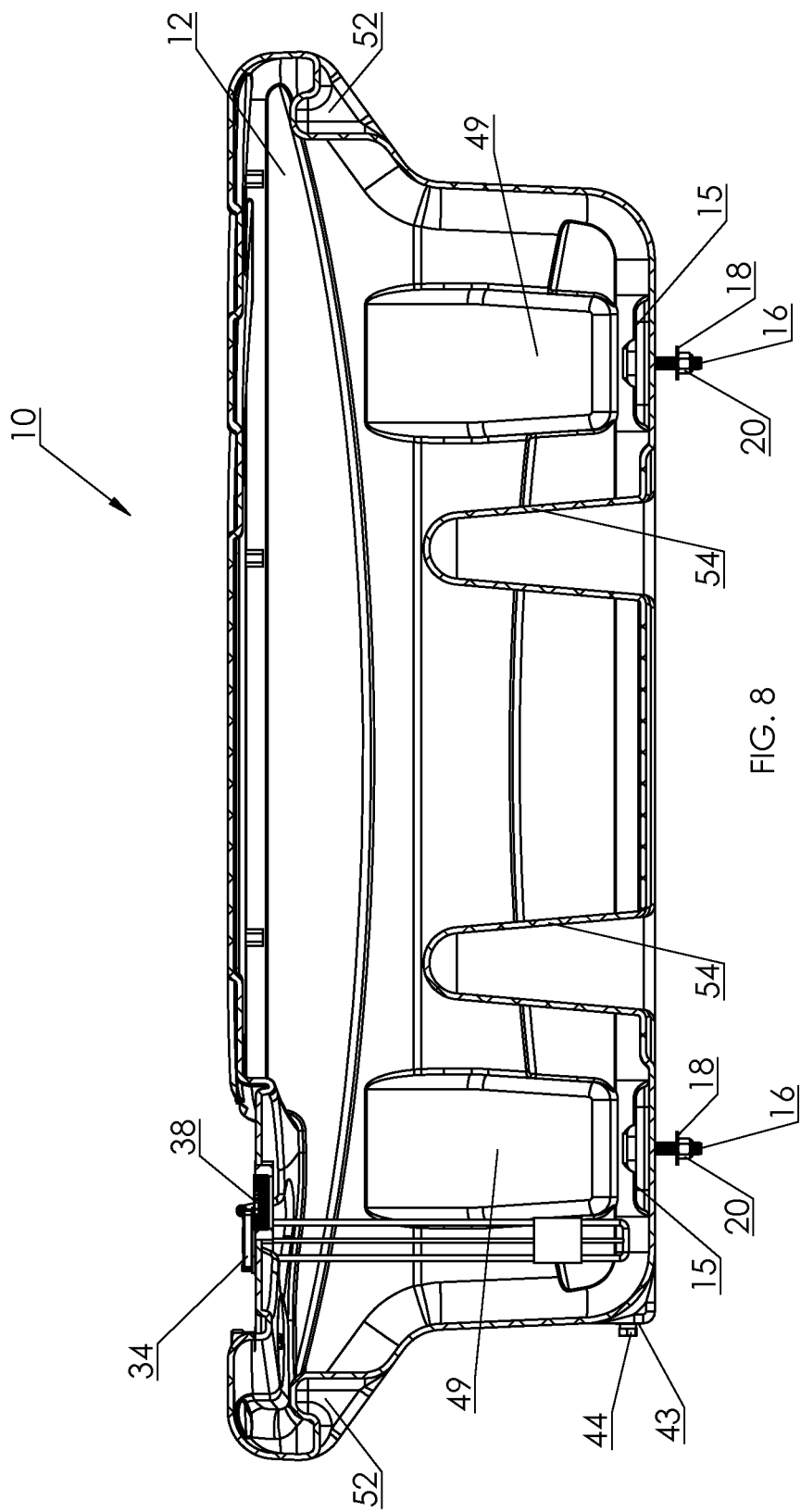
FIG. 8 is a cross-sectional view of a non-metallic in-the-bed fuel tank taken along line A-A of FIG. 7.
Figure 9:
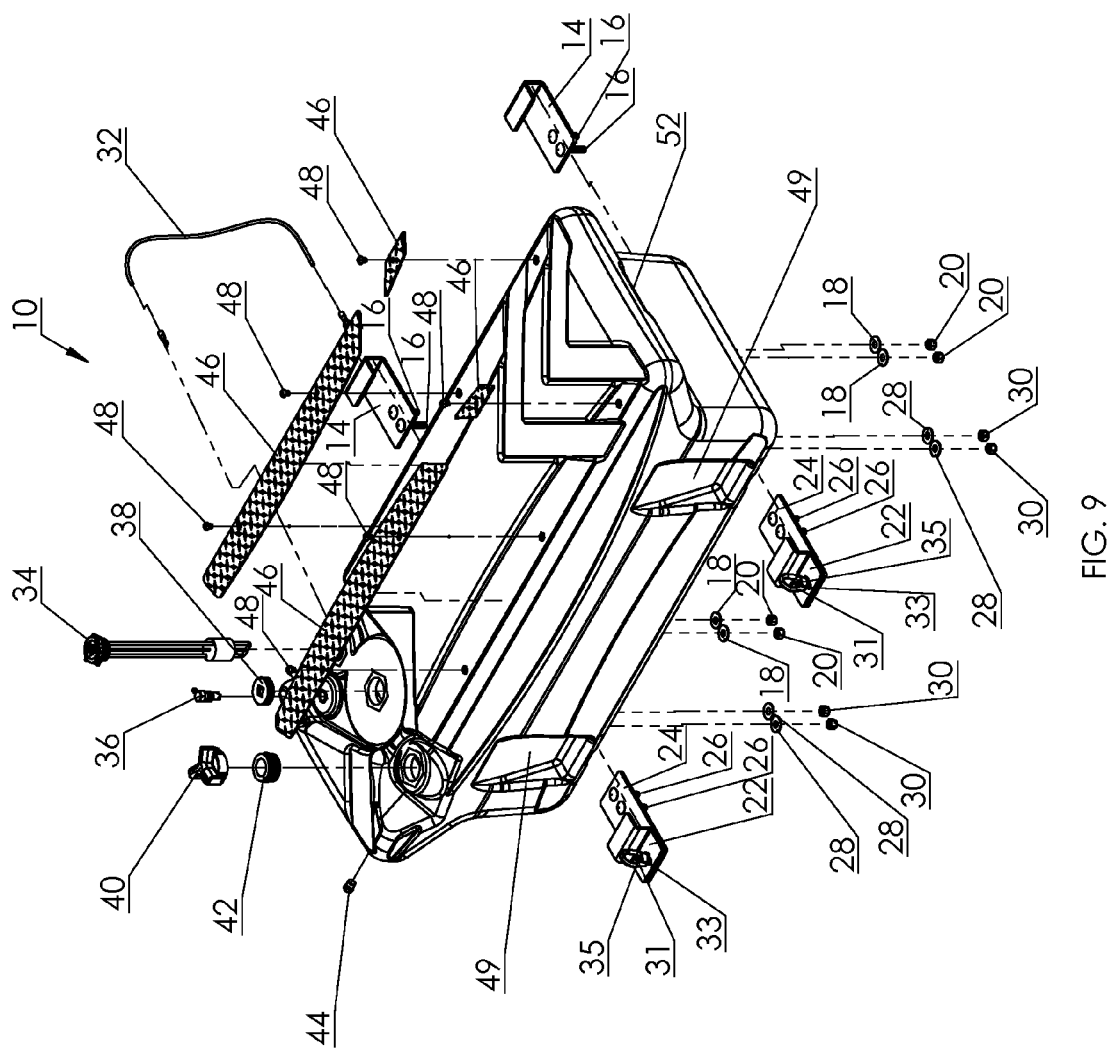
FIG. 9 is an exploded view of a non-metallic in-the-bed fuel tank.
Figure 10:
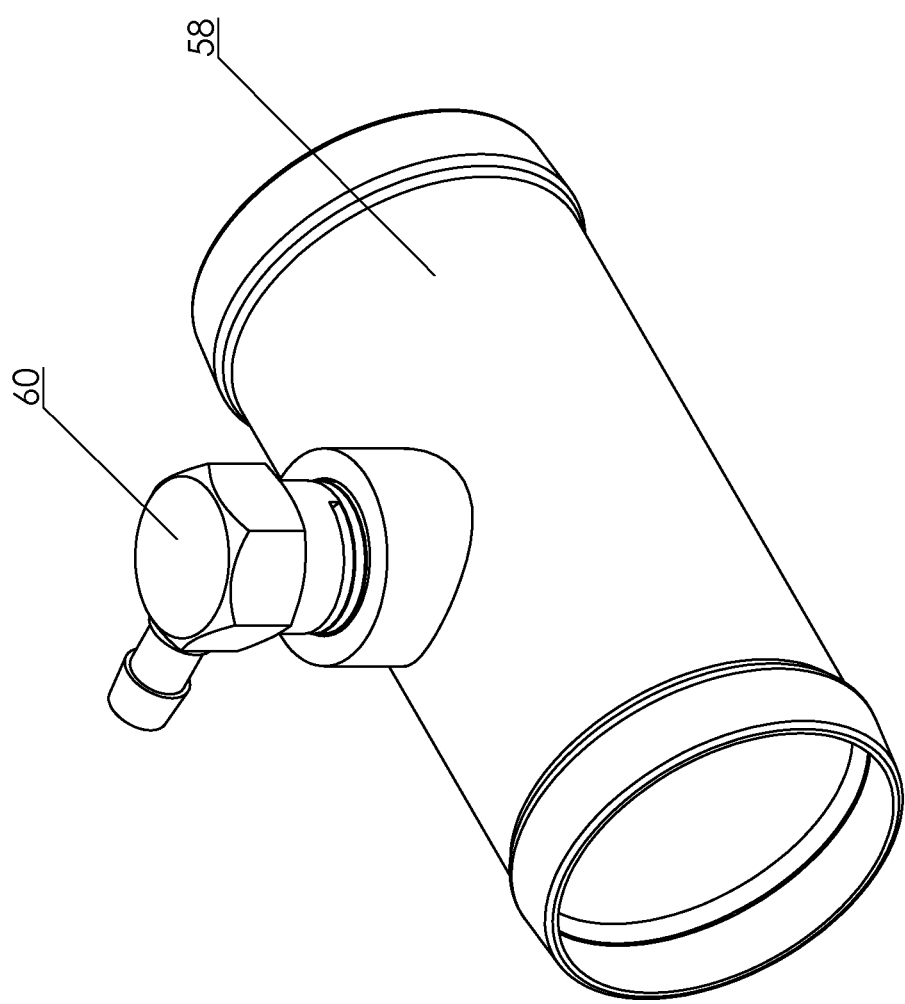
FIG. 10 is an isometric view of a single valve fuel line connector.
Figure 11:
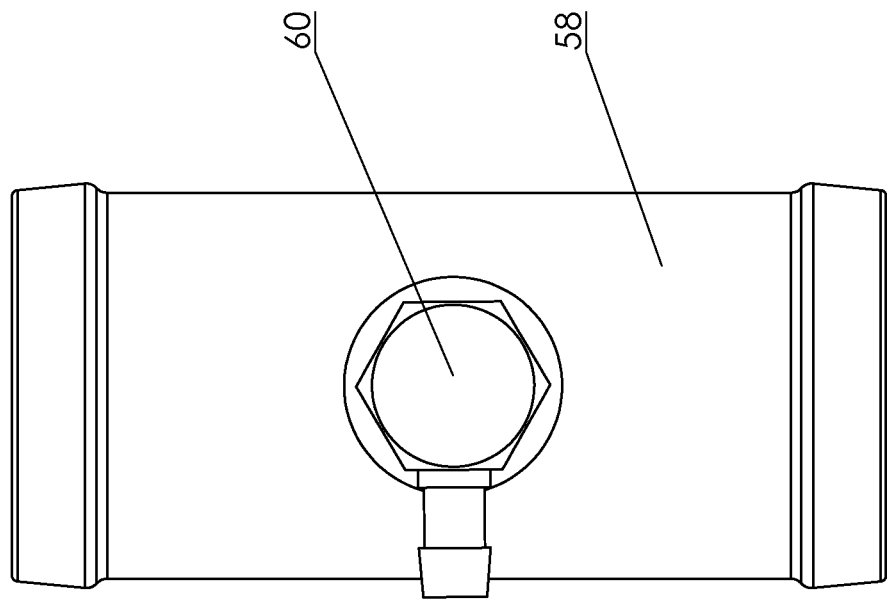
FIG. 11 is a top view of a single valve fuel line connector.
Figure 12:
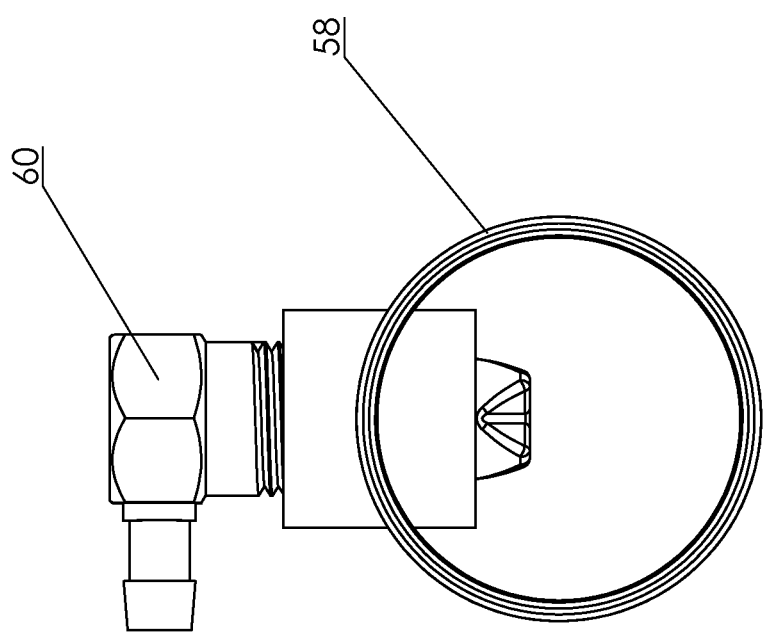
FIG. 12 is a side view of a single valve fuel line connector.
Figure 13:
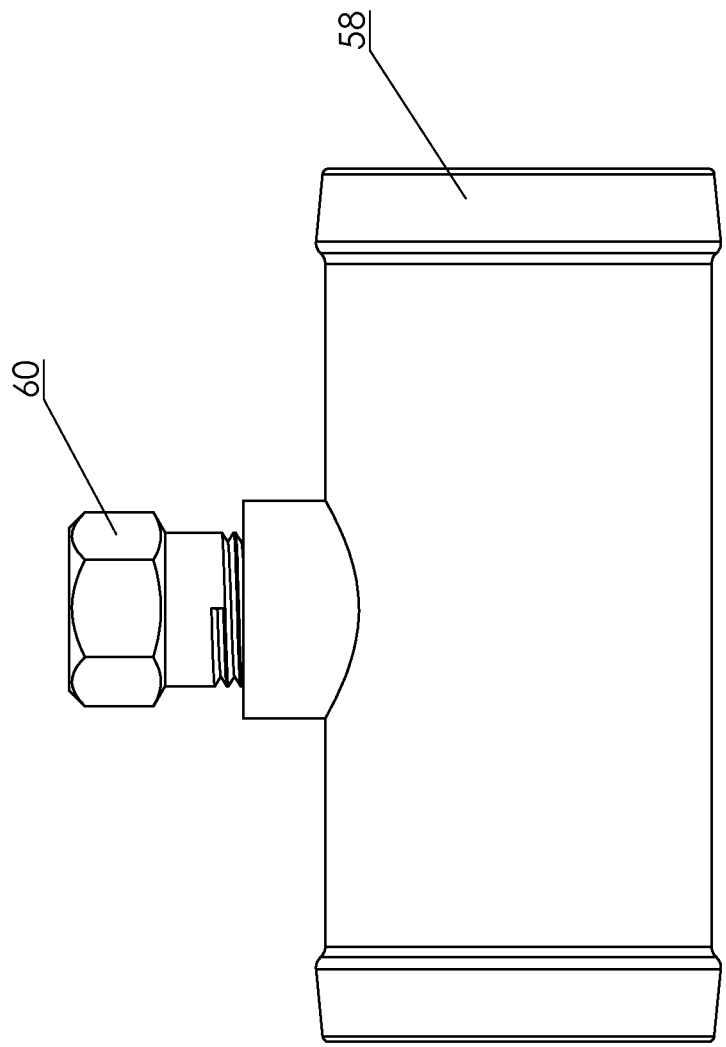
FIG. 13 is a front view of a single valve fuel line connector.
Figure 14:
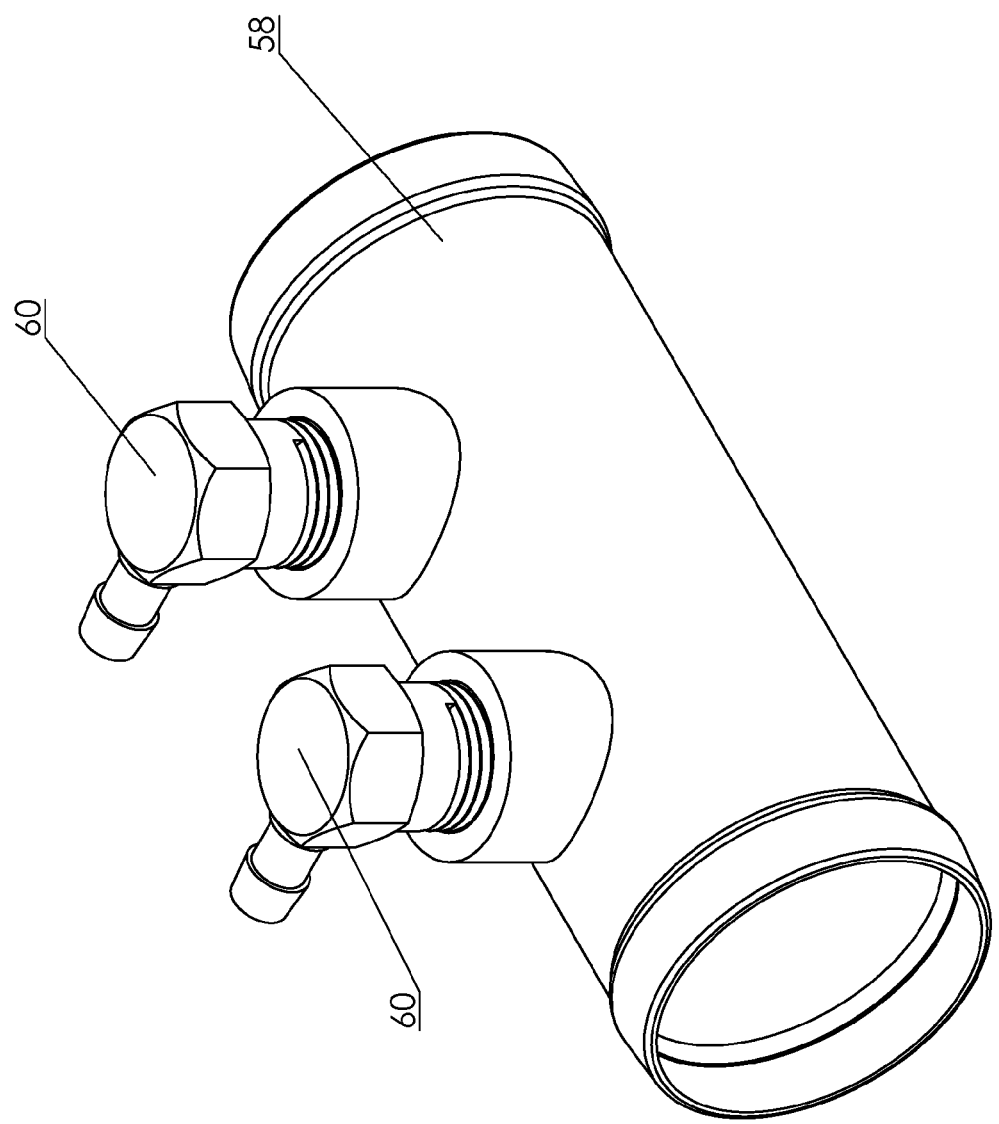
FIG. 14 is an isometric view of a double valve fuel line connector.
Figure 15:
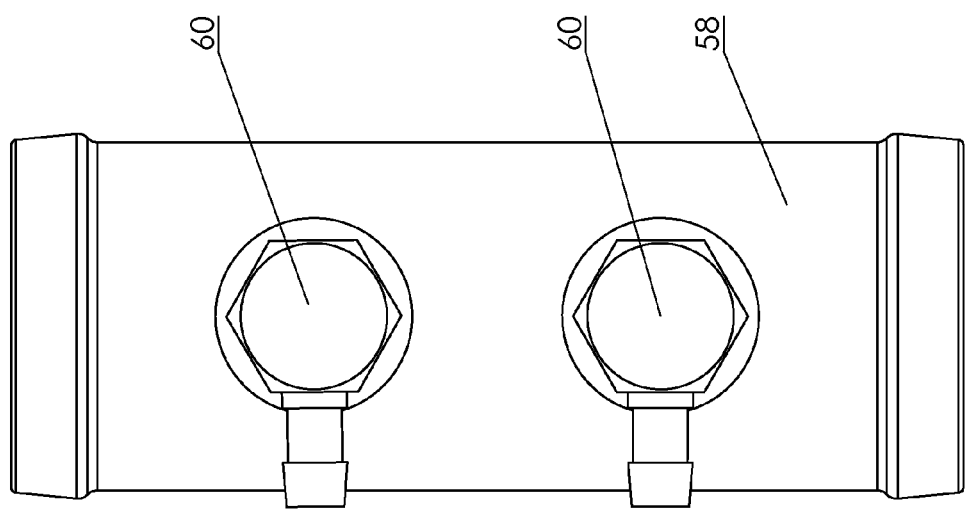
FIG. 15 is a top view of a double valve fuel line connector.
Figure 16:
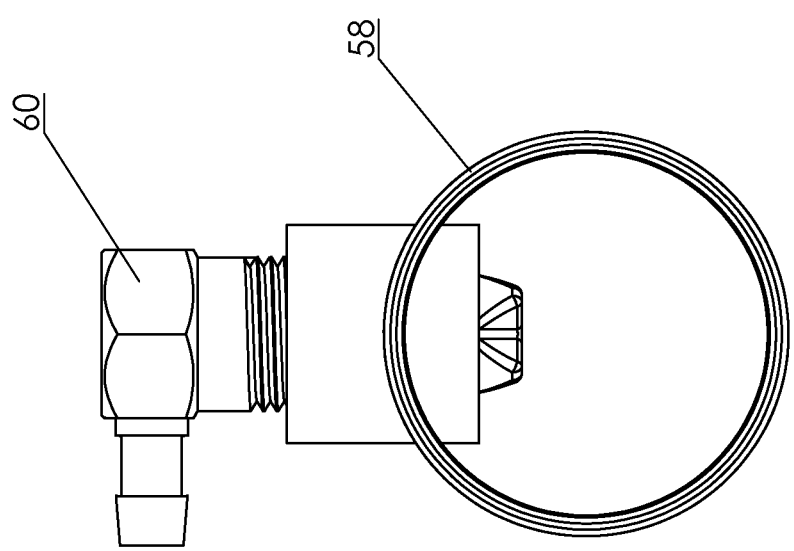
FIG. 16 is a side view of a double valve fuel line connector.
Figure 17:
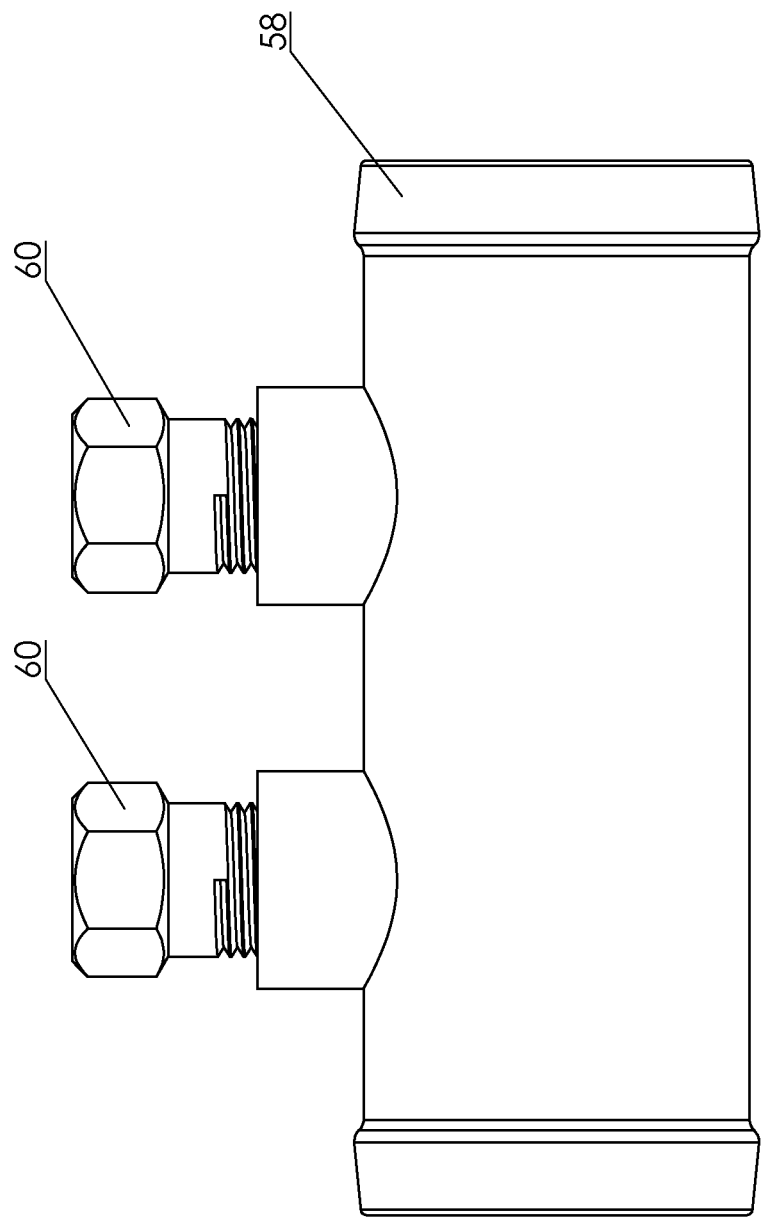
FIG. 17 is a front view of a double valve fuel line connector.
Figure 18:
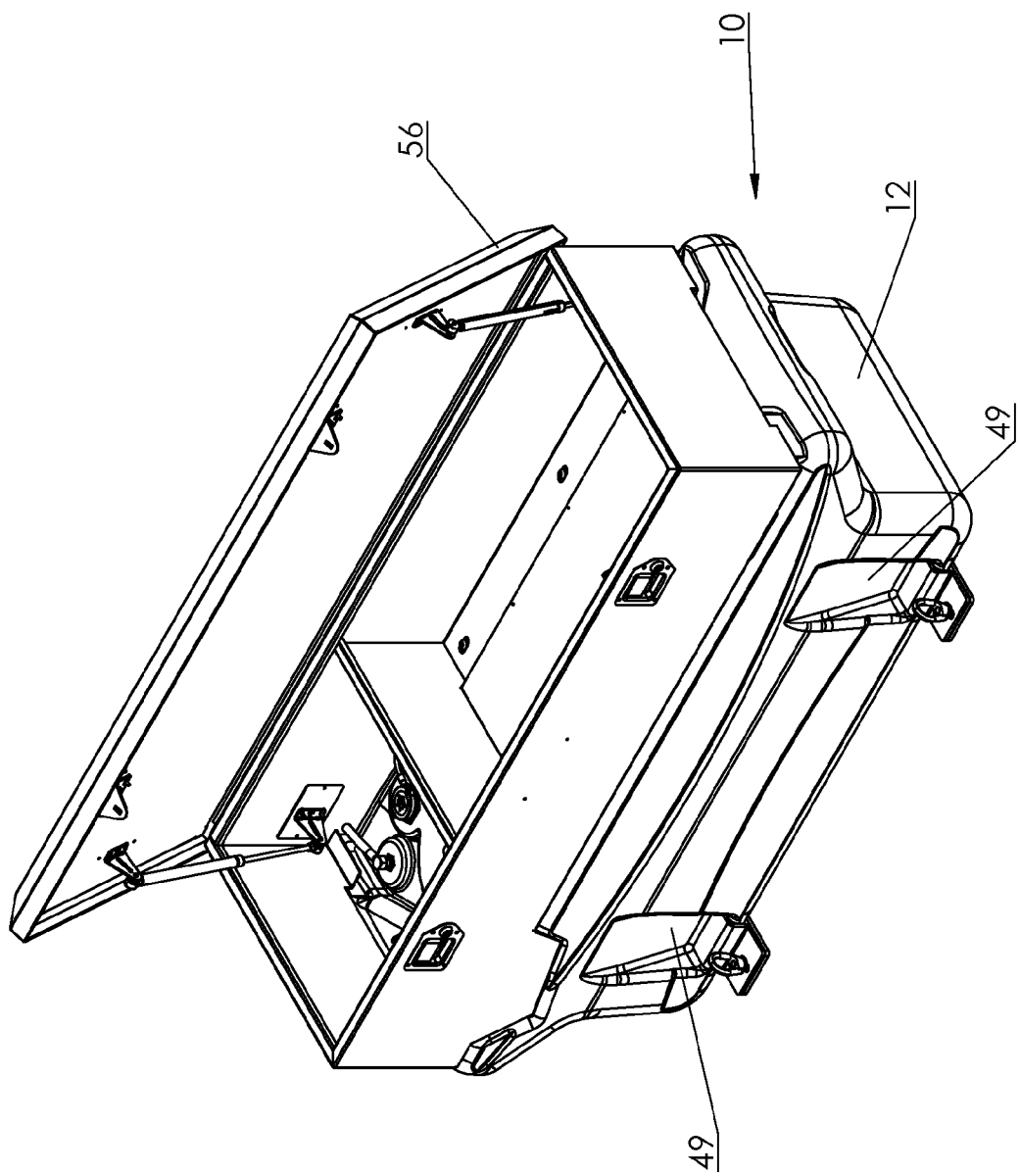
FIG. 18 is an isometric view of a non-metallic in-the-bed fuel tank with a tool box.
Figure 19:
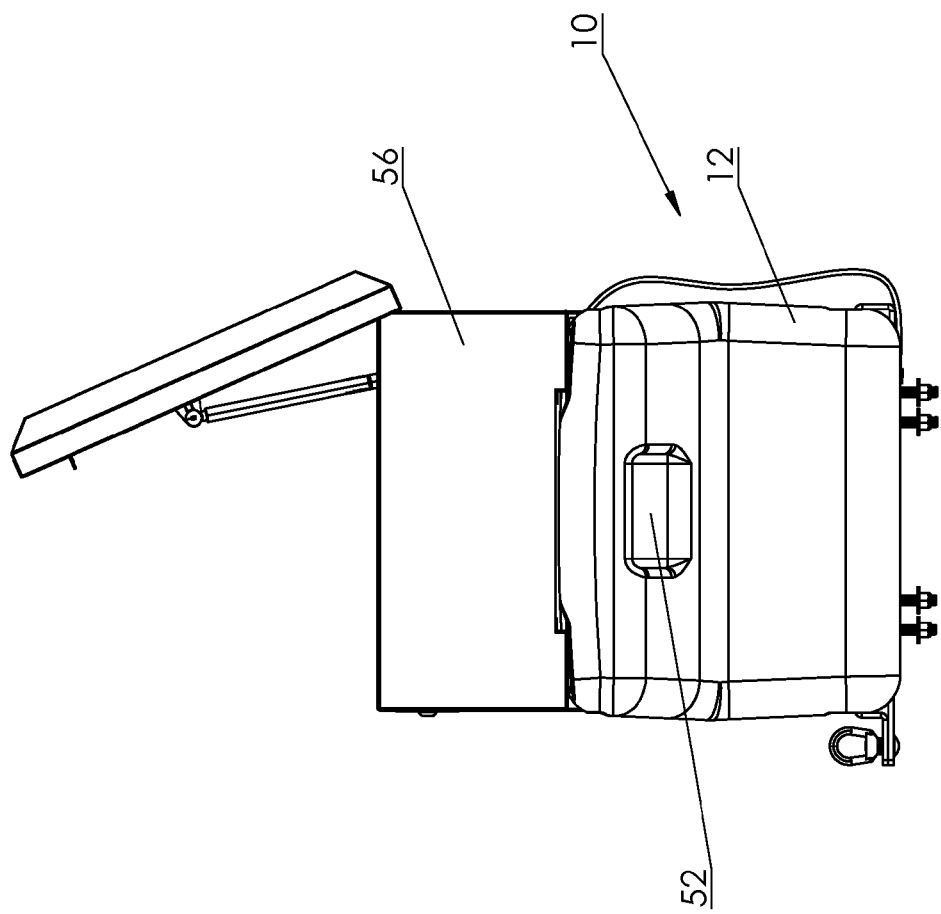
FIG. 19 is a side view of a non-metallic in-the-bed fuel tank with a tool box.
Figure 20:
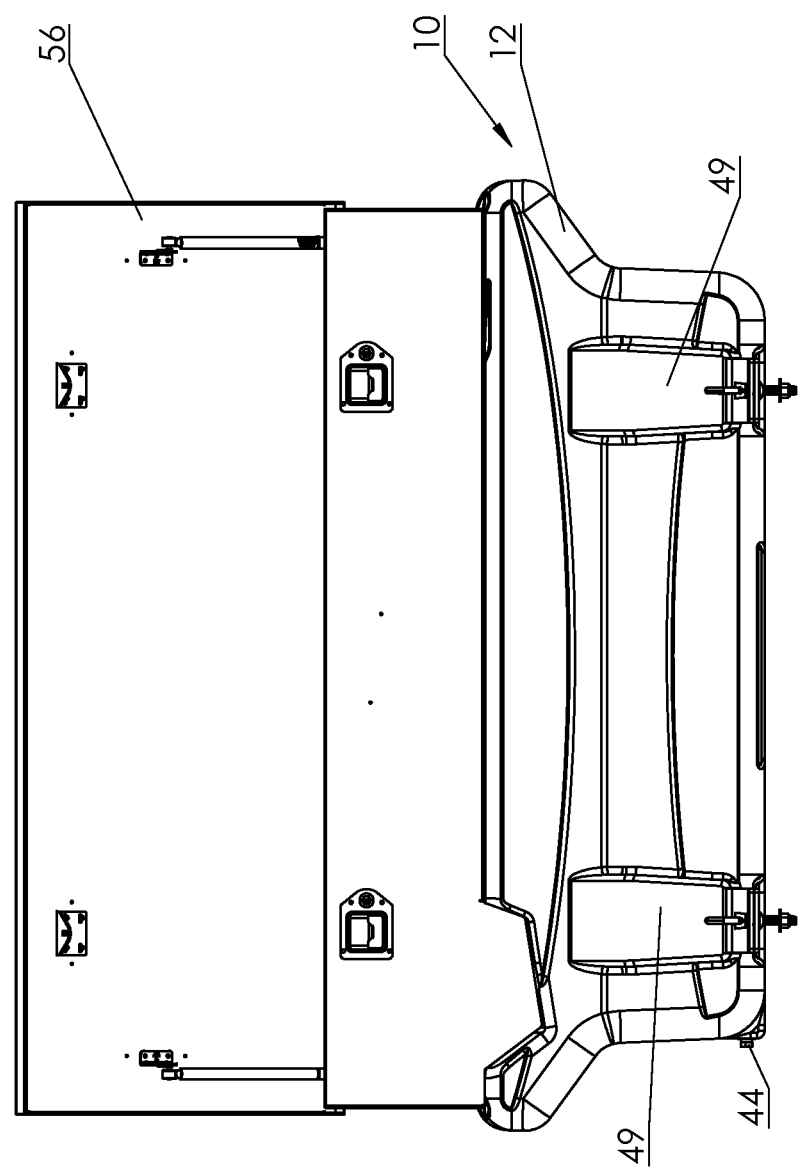
FIG. 20 is a front view of a non-metallic in-the-bed fuel tank with a tool box.
Figure 21:
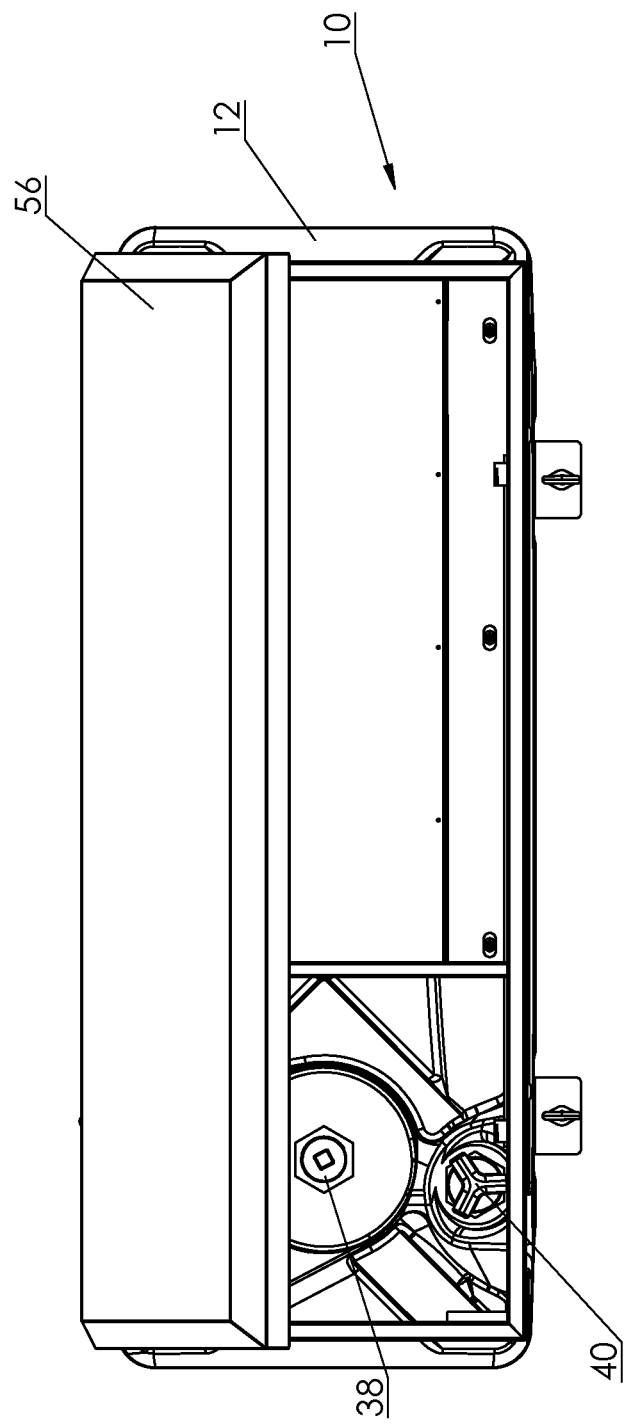
FIG. 21 is a top view of a non-metallic in-the-bed fuel tank with a tool box.
Figure 22:
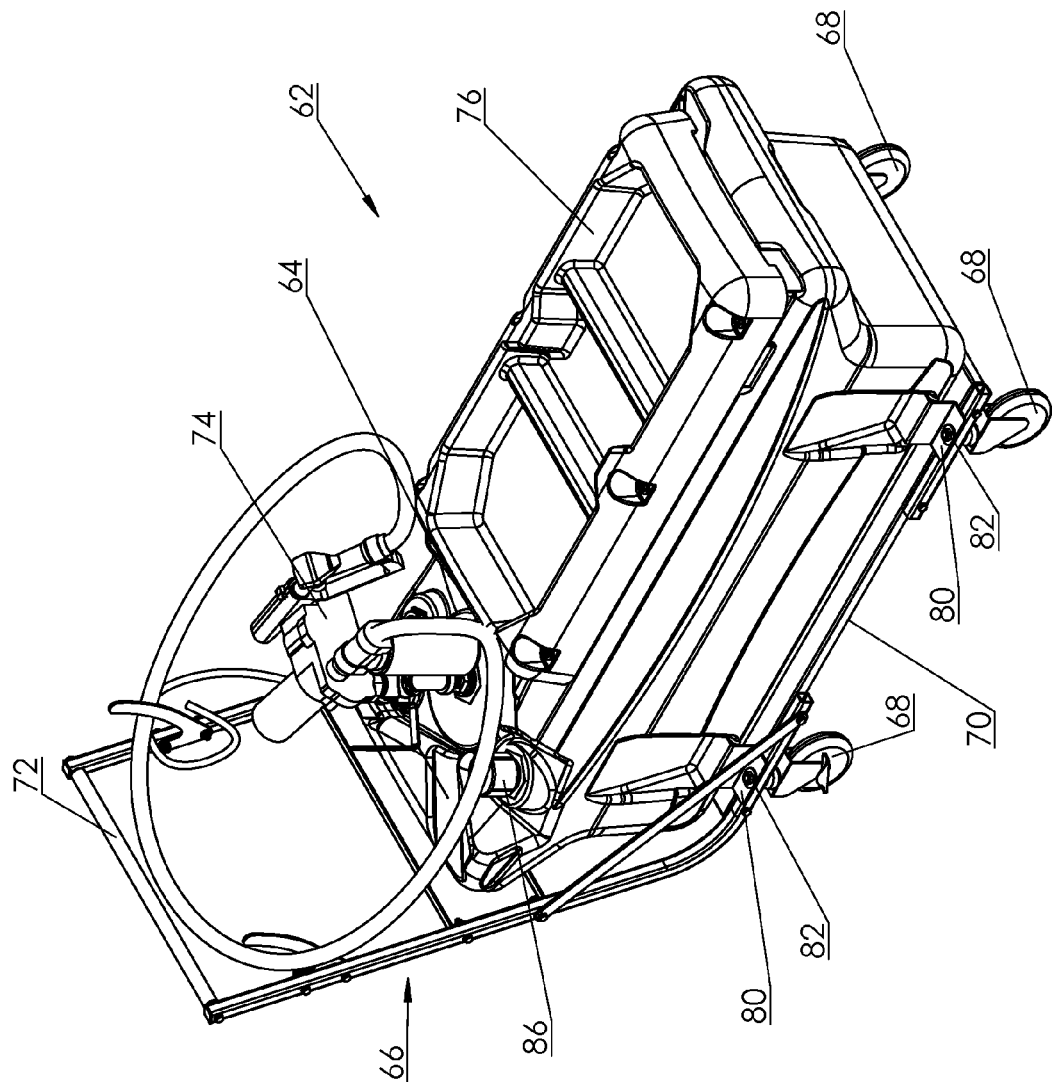
FIG. 22 is an isometric view of a portable non-metallic fuel tank.
Figure 23:
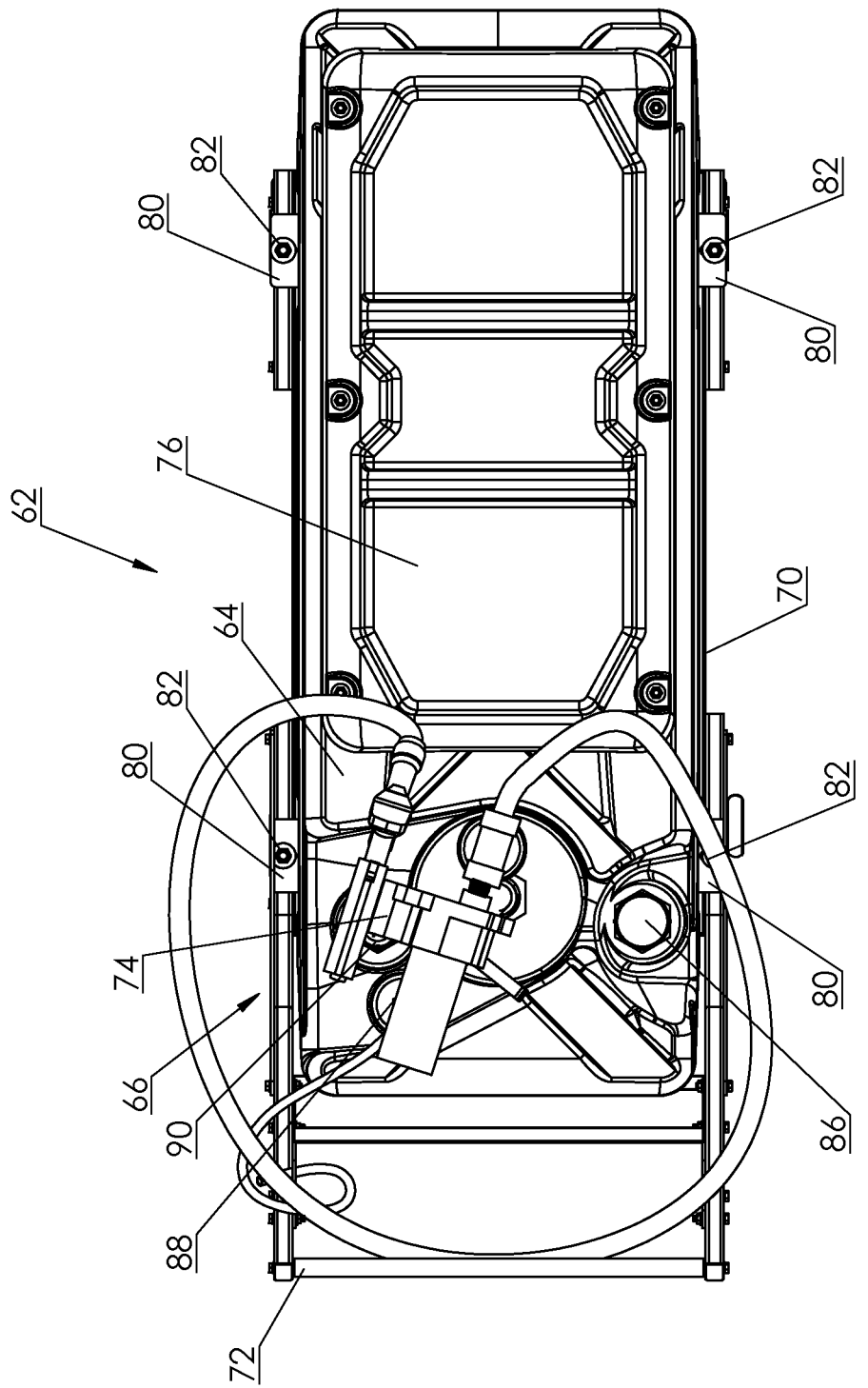
FIG. 23 is a top view of a portable non-metallic fuel tank.
Figure 24:
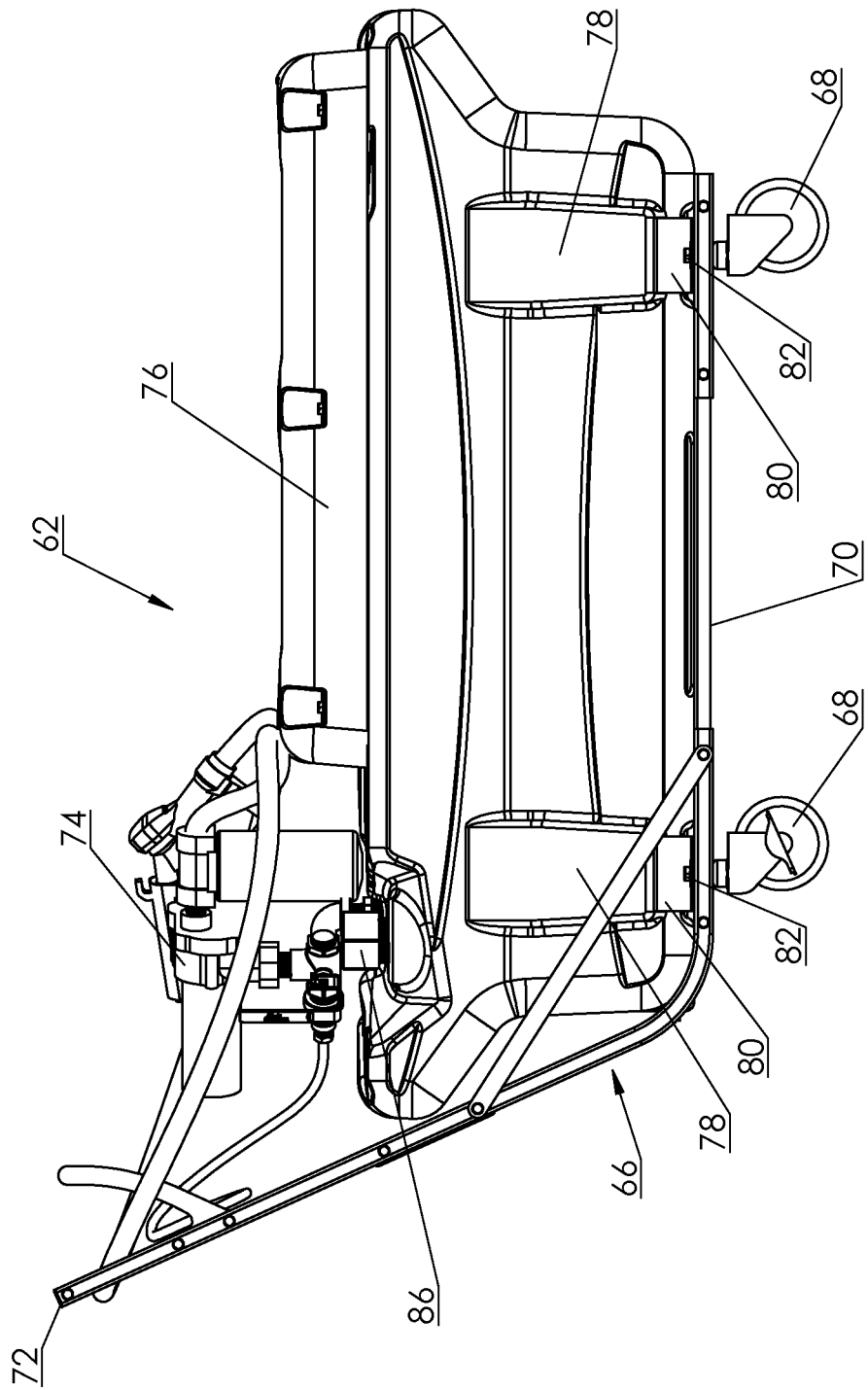
FIG. 24 is a front view of a portable non-metallic fuel tank.
Figure 25:
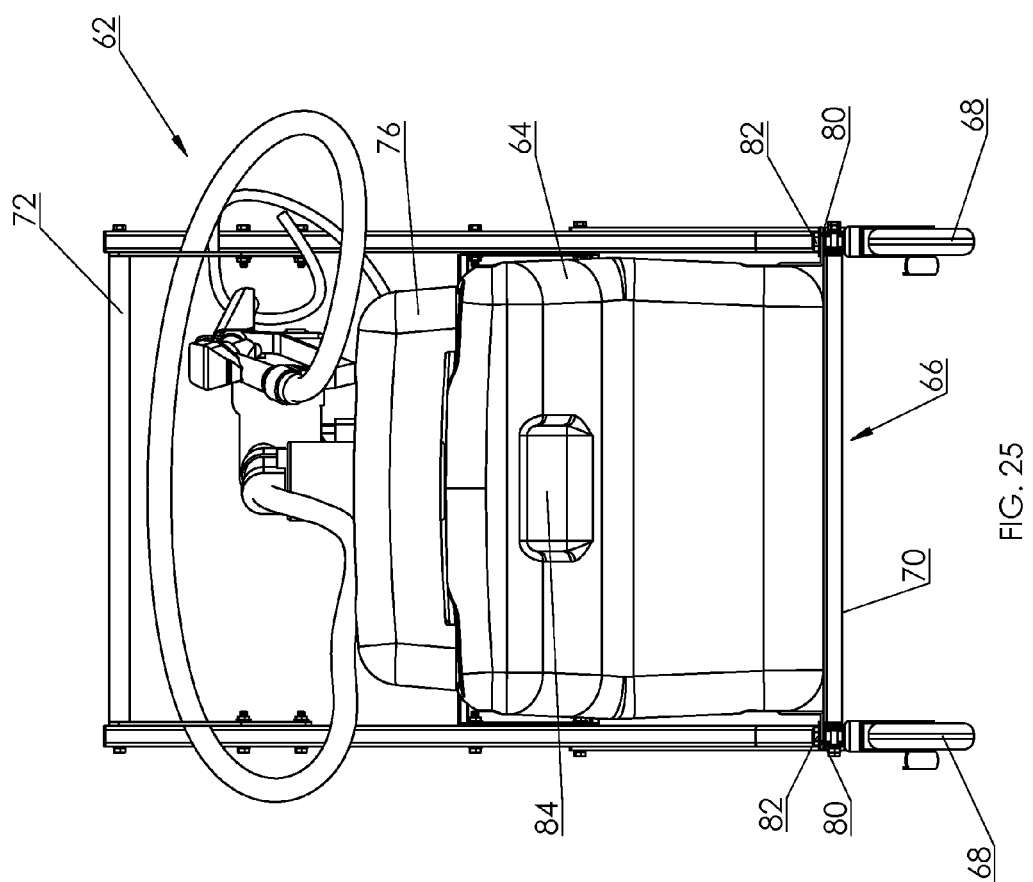
FIG. 25 is a side view of a portable non-metallic fuel tank.
Figure 26:
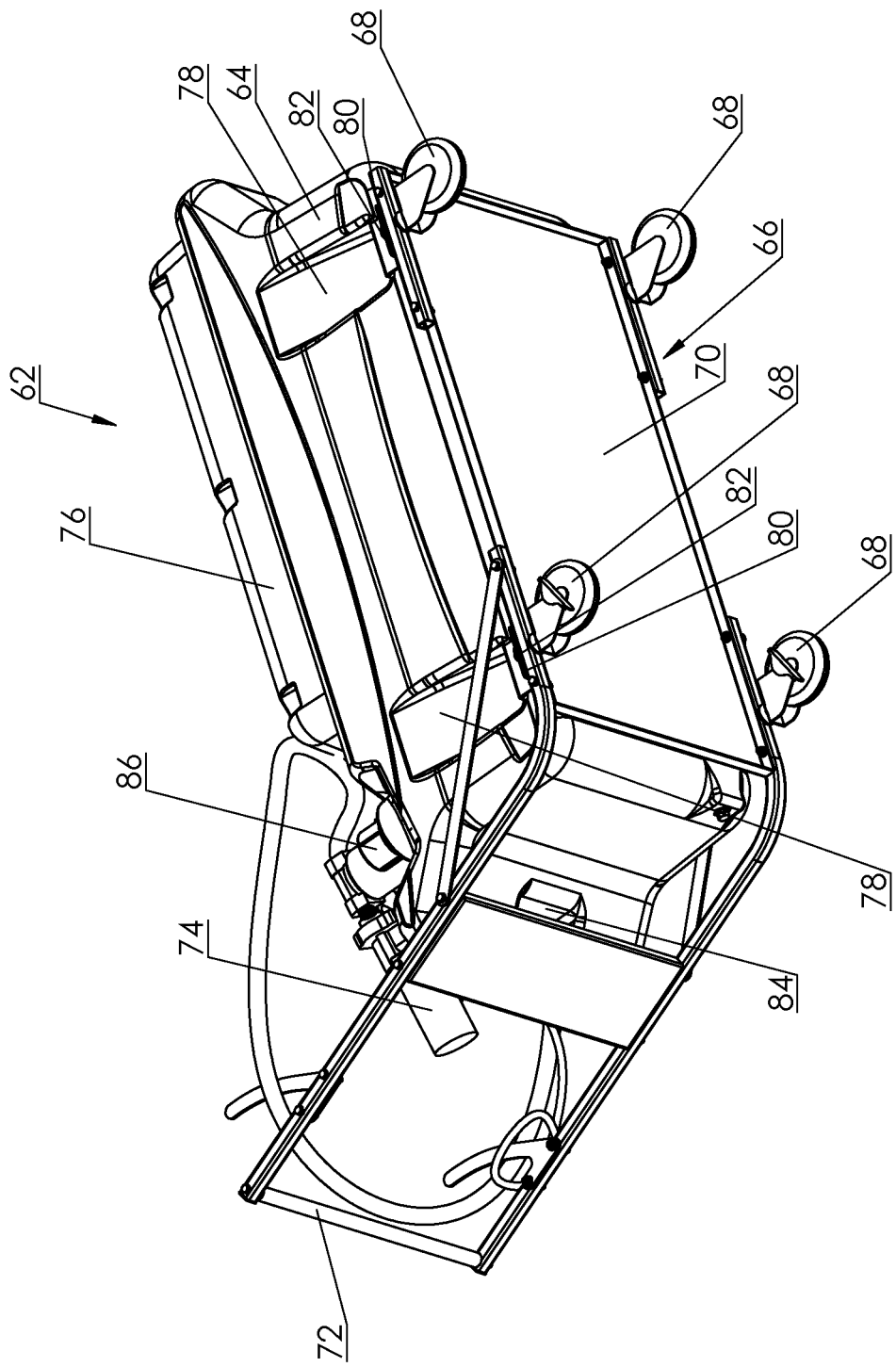
FIG. 26 is a bottom isometric view of a portable non-metallic fuel tank.

FIG. 8 is a cross sectional view of the inside of the tank 10. The inside of the tank 10 contains at least one baffle 54. In the figure, two baffles 54 are illustrated. The baffles 54 are raised portions of the tank 10 floor which extend part way to the top of the tank 10. The baffles 54 help to prevent the fuel in the tank 10 from sloshing back and forth while the vehicle is in motion. Sloshing fuel can be noisy and can cause the vehicle to sway back and forth. The baffles 54 do not extend completely across the tank 10 from front to back in order to allow the fuel to flow around the baffles 54 and into the fuel system of the vehicle.

The tank 10 is coupled to the existing fuel system in the vehicle. This is done by cutting the hose that leads from the vehicle's fuel opening to the vehicle's fuel tank. The cut in the hose is then filled with a fuel line connector 58. Two types of fuel line connectors 58 can be seen in FIGS. 10-17.

The first type of fuel line connector 58 illustrated in FIGS. 10-13 is a single valve fuel line connector 58. This connector 58 is inserted into the cut in the fuel line of the vehicle's existing fuel system.

The fuel line connector 58 has a rollover valve 60 coupled to it. The rollover valve 60 is a special type of valve used in vehicle fuel systems. It is designed to help prevent fuel leakage in case the vehicle is in an accident and rolls over.

The rollover valve 60 is coupled to the fuel line connector 58 and then also has a hose which couples the valve 60 to the fuel line opening 43 on the tank 10. When the hose is coupled to the fuel line opening 43, the fuel line plug 44 is removed.

The hose that is coupled into the rollover valve 60 allows the fuel to gravity feed into the vehicle's existing fuel tank. This means that the fuel in the tank 10 drains into the vehicle's fuel system because the fuel system is lower than the fuel level in the tank 10.

In alternative embodiments, the fuel in the tank 10 could also be transferred using a solenoid valve and gravity feeding. The valve could be switched on or off from the inside of the cab of the vehicle. When the valve is on, the fuel would then transfer through a gravity feed as described above.

In additional embodiments, a pump may be placed in the tank and may be used to transfer fuel through a nozzle to any other vehicle.

A submersible pump could also be used to pump fuel through a hose to the fuel system on the vehicle.

An in-line pump could be used to transfer fuel from the tank 10 to the vehicle. This pump would be placed in the hose through which the fuel is transferred. The pump would move the fuel to the fuel system quicker than though gravity feeding.

FIGS. 14-17 illustrate a fuel line connector 58 which has two rollover valves 60 coupled to it. The fuel line connector 58 in these figures is installed just like the fuel line connector 58 in the previous figures. The only difference is that the second rollover valve is coupled to a hose which is simply used to vent the fuel system in order to allow the fuel in the tank 10 to gravity feed more easily into the vehicle's fuel system.

This type of fuel line connector 58 is utilized in vehicles where the venting system for the fuel system is prior to the location of the fuel line connector 58. In vehicles where the fuel system venting is on the fuel tank, the single valve fuel line connector 58 is used.

FIGS. 18-21 illustrate a toolbox 56 coupled to the top of the tank 10. The toolbox 56 is a specially designed toolbox 56 which attaches to the top of the tank 10 with the tool box/diamond plate mounting screws 48. The toolbox 56 may be made of any material desired. The toolbox 56 may also be any shape desired. The toolbox 56 adds more usability to the area surrounding the tank 10.

FIGS. 22-26 illustrate a non-metallic in-the-bed fuel tank as described above, coupled to a trolley which allows the tank to be used as a portable fuel pump. This type of portable tank may be used in a repair shop, car dealership or the like.

The portable fuel tank 62 illustrated in these figures includes a tank body 64. The tank body 64 has similar features and is formed similarly to the tank body 12 described previously.

The tank body 64 is mounted to a trolley 66 or trolley system 66. The trolley 66 includes at least one wheel 68. In the pictured embodiments, four wheels 68 are used and it is likely that at least four wheels 68 would be desired for stability. The wheels 68 may be any type desired. The wheels 68 shown in the figures are casters which may be locked in place in order to prevent the portable tank 62 from rolling away when it is in use. It may also be desired that the wheels 68 are wide enough to prevent them from getting caught in openings or cracks in the shop's or dealership's floor.

The wheels 68 are attached to the trolley's 66 base 70. The base 70 can be best seen in FIG. 24. The base 70 attaches the wheels together and provides support to the tank 62. The base 70 is a rectangle of sheet metal, a plastic rectangle or the like which may be formed to match the contours of the tank.

A handle 72 may be coupled to the base 70 in order to allow the tank 62 to be easily maneuvered. The handle 72 illustrated is similar to the type of handle on a shopping cart. The handle 72 could also be formed like a wagon handle, a single or double wheelbarrow handle or the like.

The tank 62 is coupled to the trolley 66 through a coupling system similar to that used in coupling the tank 10 to the bed of the truck.

The tank 62 itself has mounting indents 78 such as those described above. These mounting indents 78 are indentations in the front and back of the tank that have a lip at the bottom. The lip is what the mounting device is coupled to.

The base 70 of the trolley 66 above each of the wheels 68 has a hole in it. Once the tank 62 is placed in position on the trolley 66, an angle iron 80 is positioned on the base 70, above each of the wheels 68.

The angle irons 80 are like those described above. They are upside down Z shaped pieces of metal with a perpendicular middle section. The bottom section of the angle iron 80 has a slotted hole cut in it.

The angle iron 80 is positioned so that the top portion of the angle iron presses down on the lip of the mounting indents 78. A bolt 82 is then placed through the hole in the base 70 of the trolley 66, through the slotted hole in the angle iron 80 and is then topped with a nut. The angle iron 80 can be repositioned prior to tightening the nut on bolt 82 in order to best secure the tank 62 to the trolley 66.

The bolt 82 can also be the bolt that secures the wheels 68 to the base 70 and therefore an additional hole in the base would not be needed.

The tank 62 itself is configured slightly differently than the in-the-bed tank described above. In particular the tank 62, has a pump 74 inserted in one of the openings in the top of the tank. The pump 74 is used to pump the fuel from the tank 62 and into a vehicle or the like.

Similar to the previous tank, a fuel cap 86 is inserted into another one of the openings in the top of the tank 62.

The tank 62 also has a fuel gauge like that described above.

The tank 62 has handles 84 molded into the sides to make it more maneuverable.

The tank 62 also has a vent 88 to prevent fumes from the fuel from building up inside the tank 62.

Finally, the tank 62 has an accessory tray 76 coupled to its top. The accessory tray 76 may be a molded plastic tray that has at least one indentation to carry different things that may be needed in the shop or dealership. For example, a mechanic may carry a battery or tools in the accessory tray 76.

In alternate embodiments, the accessory tray 76 could be replaced by a toolbox like that described previously.

Accordingly, for the exemplary purposes of this disclosure, the components defining any embodiment of the invention may be formed as one piece if it is possible for the components to still serve their function. The components may also be composed of any of many different types of materials or combinations thereof that can readily be formed into shaped objects provided that the components selected are consistent with the intended mechanical operation of the invention. For example, the components may be formed of rubbers (synthetic and/or natural), glasses, composites such as fiberglass, carbon-fiber and/or other like materials, polymers such as plastic, polycarbonate, PVC plastic, ABS plastic, polystyrene, polypropylene, acrylic, nylon, phenolic, any combination thereof, and/or other like materials, metals, such as zinc, magnesium, titanium, copper, iron, steel, stainless steel, any combination thereof, and/or other like materials, alloys, such as aluminum, and/or other like materials, any other suitable material, and/or any combination thereof.

The embodiments and examples set forth herein were presented in order to best explain the present invention and its practical applications and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, any components of the present invention indicated in the drawings or herein are given as an example of possible components and not as a limitation.

The invention claimed is:

1. A mounting system for a fuel tank for use in a bed of a truck comprising:
    a non-metallic tank body;
    at least one mounting indent formed in said non-metallic tank body;
    at least one coupling indentation formed in said non-metallic tank body;
    at least one rear toe clamp mating with said at least one mounting indent and said at least one coupling indentation;
    wherein said at least one rear toe clamp is also coupled to said bed of said truck; and
    at least one front mounting assembly, wherein said at least one front mounting assembly further comprises:
        a front mount base wherein said front mount base mates with said at least one coupling indentation and is coupled to said bed of said truck;
        and an angle iron adjustably coupled to said front mount base and mating with said at least one mounting indent.

2. The mounting system for a fuel tank of claim 1, wherein said mounting system is self leveling.

3. The mounting system for a fuel tank of claim 1, wherein said mounting system may be used in said bed of said truck which is corrugated.

4. The mounting system for a fuel tank of claim 1, wherein said at least one rear toe clamp and said front mount base are coupled to said bed of said truck before said non-metallic tank body is placed in said bed of said truck.

5. The mounting system for a fuel tank of claim 4, wherein said angle iron is coupled to said front mount base after said non-metallic tank body is placed in said bed of said truck.

6. The mounting system for a fuel tank of claim 1, wherein said angle iron is shaped like an upside down Z.

* * * * *